US012636931B2

(12) United States Patent
Jin et al.

(10) Patent No.: US 12,636,931 B2
(45) Date of Patent: May 26, 2026

(54) VALVE MANIFOLD INTEGRATION MODULE FOR THERMAL MANAGEMENT SYSTEM, VEHICLE THERMAL MANAGEMENT SYSTEM, AND VEHICLE

(71) Applicant: BYD COMPANY LIMITED, Shenzhen (CN)

(72) Inventors: Wei Jin, Shenzhen (CN); Shibai Li, Shenzhen (CN); Min Xu, Shenzhen (CN); Meijiao Ye, Shenzhen (CN); Yuzhong Li, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 307 days.

(21) Appl. No.: 18/373,965

(22) Filed: Sep. 28, 2023

(65) Prior Publication Data

US 2024/0025226 A1     Jan. 25, 2024

Related U.S. Application Data

(63) Continuation of application No. PCT/CN2022/095213, filed on May 26, 2022.

(30) Foreign Application Priority Data

May 31, 2021     (CN) .......................... 202110600840.1

(51) Int. Cl.
    *B60H 1/00*        (2006.01)
    *B60H 1/32*        (2006.01)
    *F25B 41/20*       (2021.01)
(52) U.S. Cl.
    CPC ..... B60H 1/00485 (2013.01); B60H 1/00885 (2013.01); B60H 1/3229 (2013.01); F25B 41/20 (2021.01); B60H 2001/00107 (2013.01)

(58) Field of Classification Search
    CPC ............ B60H 1/00485; B60H 1/00885; B60H 2001/00107; B60H 1/3229; B60H 1/00007; F25B 41/20
    See application file for complete search history.

(56) References Cited

U.S. PATENT DOCUMENTS

2020/0031198 A1*  1/2020  Chen .................. B60H 1/00278
2020/0254846 A1   8/2020  Hatakeyama et al.
                  (Continued)

FOREIGN PATENT DOCUMENTS

CN        204388447 U     6/2015
CN        108068572 A     5/2018
                  (Continued)

OTHER PUBLICATIONS

International Search Report and Written Opinion for Application No. PCT/CN2022/095213, mailed on Aug. 26, 2022, 9 pages.
                  (Continued)

*Primary Examiner* — Marina A Tietjen
(74) *Attorney, Agent, or Firm* — Sheppard Mullin Richter & Hampton LLP

(57)          ABSTRACT

A valve manifold integration module for a thermal management system is provided. The thermal management system has multiple preset thermal management modes. The valve manifold integration module includes: multiple flow channels, disposed inside the valve manifold integration module; and a valve manifold, including multiple valves. The valves are disposed on the valve manifold integration module. The valves communicate with the flow channels. The multiple flow channels are communicated with each other via the valves to form fluid channels, to realize at least one of the thermal management modes.

22 Claims, 7 Drawing Sheets

(56) References Cited

U.S. PATENT DOCUMENTS

| | | | |
|---|---|---|---|
| 2021/0005341 A1 | 1/2021 | Cummins | |
| 2021/0053415 A1 | 2/2021 | Oh et al. | |

FOREIGN PATENT DOCUMENTS

| | | | | | |
|---|---|---|---|---|---|
| CN | 111038216 | A | | 4/2020 | |
| CN | 111231613 | A | | 6/2020 | |
| CN | 111231621 | A | | 6/2020 | |
| CN | 111976416 | A | | 11/2020 | |
| CN | 112339525 | A | | 2/2021 | |
| CN | 112810402 | A | | 5/2021 | |
| CN | 215063015 | U | * | 12/2021 | ........... B60H 1/3229 |
| CN | 215751808 | U | * | 2/2022 | ........... B60H 1/3229 |
| CN | 115476640 | A | * | 12/2022 | ............. F25B 41/34 |
| JP | H11-23071 | A | | 1/1999 | |
| JP | 2005054894 | A | * | 3/2005 | |
| JP | 4572517 | B2 | * | 11/2010 | |
| JP | 2018-184075 | A | | 11/2018 | |
| JP | 2021-047000 | A | | 3/2021 | |
| KR | 10-2019-0033114 | A | | 3/2019 | |
| KR | 20210008673 | A | | 1/2021 | |
| KR | 102541514 | B1 | * | 6/2023 | ......... B60H 1/00485 |
| WO | 2021/048095 | A1 | | 3/2021 | |
| WO | 2021/049435 | A1 | | 3/2021 | |
| WO | WO-2022245155 | A1 | * | 11/2022 | ........... F28D 9/0093 |

OTHER PUBLICATIONS

First Office Action dated Mar. 4, 2025, issued in Chinese Patent Application No. 202110600840.1, English machine translation only (13 pages).

Second Office Action dated Aug. 12, 2025, issued in Chinese Patent Application No. 202110600840.1, English machine translation only (13 pages).

Extended European Search Report dated Sep. 26, 2024, issued in European Patent Application No. 22815141.1 (7 pages).

Notice of Reasons for Refusal dated Oct. 1, 2024, issued in Japanese Patent Application No. 2023-560755, with English machine translation (10 pages).

Decision to Grant a Patent dated Feb. 18, 2025, issued in Japanese Patent Application No. 2023-560755, with English machine translation (5 pages).

Examination Report No. 1 dated Oct. 2, 2024, issued in Australian Patent Application No. 2022287059 (6 pages).

* cited by examiner

B—B

VALVE MANIFOLD INTEGRATION MODULE FOR THERMAL MANAGEMENT SYSTEM, VEHICLE THERMAL MANAGEMENT SYSTEM, AND VEHICLE

CROSS-REFERENCE TO RELATED APPLICATIONS

This application is a Continuation Application of International Patent Application No. PCT/CN2022/095213, filed on May 26, 2022, which is based on and claims priority to and benefits of Chinese Patent Application No. 202110600840.1 filed on May 31, 2021. The entire content of all of the above-referenced applications is incorporated herein by reference.

FIELD

The present disclosure relates to the field of vehicle technologies, and more particularly, to a valve manifold integration module for a thermal management system, a vehicle thermal management system, and a vehicle.

BACKGROUND

A heat pump air-conditioning system is an important part of a vehicle that can change the temperature inside the vehicle, so that a driver and passengers can gain a good experience. A variety of valves, such as electronic expansion valves and solenoid switch valve, are arranged in an existing heat pump air-conditioning system according to functional needs. Typically, these valves are independently mounted in pipes, which leads to a complex pipe structure of the heat pump air-conditioning system, making it difficult to mount and not suitable for a platform-based design. Moreover, the large number of pipes are costly to design, messy in arrangement and troublesome in maintenance. In addition, since most of the existing valves are electronic valves, each electronic valve needs to be connected to an electric wire harness of the vehicle. Moreover, valve bodies are scattered, thereby resulting in high costs of the vehicle wire harness.

SUMMARY

The present disclosure provides a valve manifold integration module for a thermal management system. The valve manifold integration module integrates a variety of valves, which is beneficial to simplifying the structure of the vehicle thermal management system, reducing the space occupied by integrated valves, and reducing the costs.

The present disclosure provides a valve manifold integration module for a thermal management system. The thermal management system has multiple thermal management modes. The valve manifold integration module includes:

multiple flow channels, disposed inside the valve manifold integration module; and a valve manifold, the valve manifold including multiple valves, the valves being disposed on the valve manifold integration module, and the valves communicating with the flow channels.

The flow channels communicate with each other via the valves to form fluid channels to realize at least one of the thermal management modes.

In an embodiment, the flow channels include first flow channels and second flow channels. The first flow channels are distributed in a same plane. The second flow channels are distributed in different planes. Communications between the first flow channels and the second flow channels are controlled by the valve manifold to form the fluid channels.

In an embodiment, the valve manifold integration module further includes an interface. The interface is configured to connect the fluid channel to an external heat exchange component in the thermal management system.

In an embodiment, the interface includes more than one of a condenser interface, an air-conditioning heat exchanger interface, an evaporator interface, a battery pack heat exchanger interface, a motor heat exchanger interface, and a compressor interface. The condenser interface, the air-conditioning heat exchanger interface, the evaporator interface, the battery pack heat exchanger interface, the motor heat exchanger interface and the compressor interface are configured to be connected to corresponding components of an external thermal management system.

In an embodiment, the condenser interface is configured to be connected to a condenser in the external thermal management system. The air-conditioning heat exchanger interface is configured to be connected to an air-conditioning heat exchanger in the external thermal management system. The evaporator interface is configured to be connected to an evaporator in the external thermal management system. The compressor interface is configured to be connected to a compressor in the external thermal management system.

In an embodiment, the condenser interface includes a condenser outlet interface, the air-conditioning heat exchanger interface includes an air-conditioning heat exchanger inlet interface and an air-conditioning heat exchanger outlet interface, and the evaporator interface includes an evaporator inlet interface.

The valve manifold further includes a first switch valve and a second expansion valve.

A first port of the first switch valve is connected to the condenser outlet interface, and a second port of the first switch valve is connected to the air-conditioning heat exchanger inlet interface.

A first port of the second expansion valve is connected to the air-conditioning heat exchanger outlet interface, and a second port of the second expansion valve is connected to the evaporator inlet interface, to realize an air-conditioning cooling mode of the thermal management modes.

In an embodiment, the valve manifold further includes a first expansion valve and a second switch valve.

A first port of the first expansion valve is connected to the condenser outlet interface, and a second port of the first expansion valve is connected to the air-conditioning heat exchanger inlet interface.

A first port of the second switch valve is connected to the air-conditioning heat exchanger outlet interface, and a second port of the second switch valve is connected to an inlet of the compressor, to realize an air-conditioning heating mode of the thermal management modes.

In an embodiment, the battery pack heat exchanger interface includes a battery pack heat exchanger first interface and a battery pack heat exchanger second interface.

The valve manifold further includes a third expansion valve and a fourth switch valve. A first port of the third expansion valve is connected to the battery pack heat exchanger second interface, and a second port of the third expansion valve is connected to the air-conditioning heat exchanger outlet interface.

A first port of the fourth switch valve is connected to the battery pack heat exchanger first interface, and a second port of the fourth switch valve is configured to be connected to an inlet of the compressor, to realize a battery cooling mode, or an air-conditioning cooling and battery cooling mode of the thermal management modes.

In an embodiment, the compressor interface includes a compressor outlet interface, and the motor heat exchanger interface includes a motor heat exchanger first interface and a motor heat exchanger second interface.

The valve manifold further includes a second switch valve and a third switch valve. A first port of the third switch valve is connected to the compressor outlet interface, a second port of the third switch valve is connected to the battery pack heat exchanger first interface, a second port of the third expansion valve is connected to the motor heat exchanger first interface, a first port of the second switch valve is connected to the motor heat exchanger second interface, and a second port of the second switch valve is configured to be connected to the inlet of the compressor, to realize a battery heating mode, or an air-conditioning cooling and battery heating mode of the thermal management modes.

In an embodiment, the valve manifold further includes a first expansion valve. A first port of the first expansion valve is connected to the condenser outlet interface, and a second port of the first expansion valve is connected to the motor heat exchanger first interface, to realize a heat pump heating mode, or a heat pump heating and battery cooling mode, or a heat pump heating and battery heating mode of the thermal management modes.

In an embodiment, the motor heat exchanger second interface is further connected to the first port of the second expansion valve, to realize an air-conditioning cooling, air-conditioning dehumidifying, and battery heating mode, or an air-conditioning cooling, air-conditioning dehumidifying, and battery cooling mode of the thermal management modes.

In an embodiment, the valve manifold further includes a fifth switch valve and a sixth switch valve.

A first port of the fifth switch valve is connected to the second port of the first switch valve and the second port of the first expansion valve, and a second port of the fifth switch valve is connected to the motor heat exchanger first interface.

A first port of the sixth switch valve is connected to the second port of the first switch valve and the second port of the first expansion valve, and a second port of the sixth switch valve is configured to be connected to the air-conditioning heat exchanger inlet interface.

In an embodiment, the valve manifold further includes a first one-way valve and a second one-way valve.

A first port of the first one-way valve is connected to the second port of the third expansion valve, and a second port of the first one-way valve is configured to be connected to the motor heat exchanger first interface. The first one-way valve is configured to allow a fluid to flow from the first port to the second port of the first one-way valve.

A first port of the second one-way valve is connected to the air-conditioning heat exchanger outlet interface, and a second port of the second one-way valve is connected to the second port of the third expansion valve. The second one-way valve is configured to allow the fluid to flow only from the first port to the second port of the second one-way valve.

In an embodiment, the interface further includes the gas-liquid separator interface that includes a gas-liquid separator inlet interface, and the evaporator interface further includes an evaporator outlet interface. The evaporator outlet interface is connected to the gas-liquid separator inlet interface.

In an embodiment, the flow channels include the first flow channels distributed in the same plane.

The first flow channels include a first branch. The condenser outlet interface communicates with the first port of the first switch valve and the first port of the first expansion valve through the first branch.

In some embodiments, the first flow channels include a second branch. The second port of the first switch valve and the second port of the first expansion valve communicate with the first port of the fifth switch valve through the second branch, and the second port of the first switch valve and the second port of the first expansion valve communicate with the first port of the sixth switch valve through the second branch.

In some embodiments, the first flow channels include a third branch. The second port of the sixth switch valve communicates with the air-conditioning heat exchanger inlet interface through the third branch.

In some embodiments, the first flow channels include a fourth branch. The air-conditioning heat exchanger outlet interface and the motor heat exchanger second interface communicate with the first port of the second switch valve through the fourth branch, and the air-conditioning heat exchanger outlet interface and the motor heat exchanger second interface communicate with the first port of the second expansion valve through the fourth branch.

In some embodiments, the first flow channels include a fifth branch. The second port of the third switch valve and the battery pack heat exchanger first interface communicate with the first port of the fourth switch valve through the fifth branch.

In some embodiments, the first flow channels include a sixth branch. The second port of the second switch valve, the evaporator outlet interface, and the second port of the fourth switch valve communicate with the inlet of the compressor through the sixth branch.

In an embodiment, the valve manifold integration module includes a first half body and a second half body. The first half body includes a first connection surface, the second half body includes a second connection surface, and the first connection surface is connected to the second connection surface.

The multiple second flow channels are disposed inside the first half body, and the second connection surface of the second half body includes at least one groove, such that the at least one groove on the second connection surface and the first connection surface define the first flow channels.

In an embodiment, the valve manifold integration module includes the first half body and the second half body. The first half body includes the first connection surface, the second half body includes the second connection surface, and the first connection surface is connected to the second connection surface.

The multiple second flow channels are disposed inside the first half body, and the first connection surface of the first half body includes at least one groove, such that the second connection surface and the at least one groove on the first half body define the first flow channels.

In an embodiment, the at least one groove is a curved groove or a straight groove.

In an embodiment, multiple hollow portions are formed in the first half body.

In an embodiment, the interface further includes a motor heat exchanger third interface and a motor heat exchanger fourth interface, and the valve manifold integration module further includes a pump and an accommodating box for accommodating a coolant. An outlet of the pump is connected to the motor heat exchanger third interface such that the coolant is pumped to the motor heat exchanger third interface, so an inlet of the accommodating box is connected to the motor heat exchanger fourth interface, and an outlet of the accommodating box is connected to an inlet of the pump.

In an embodiment, the valve manifold integration module further includes a three-way valve. A first port of the three-way valve is connected to the motor heat exchanger fourth interface, a second port of the three-way valve is configured to be connected to an inlet of a radiator of a coolant flow path where a motor is located, and a third port of the three-way valve is configured to be connected to an inlet of a high-pressure system of the coolant flow path.

The present disclosure further provides a vehicle thermal management system, including thermal management system components and a valve manifold integration module described above. The thermal management system components include the compressor, the condenser, the air-conditioning heat exchanger, and the evaporator, and at least one of the compressor interface, the condenser interface, the heat exchanger interface, and the evaporator interface is disposed on the valve manifold integration module so as to be connected to the corresponding thermal management system component.

In an embodiment, the vehicle thermal management system further includes a gas-liquid separator, and a gas-liquid separator interface configured to be connected to the gas-liquid separator is disposed on the valve manifold integration module.

In an embodiment, the vehicle thermal management system further includes a battery pack heat exchanger, and the battery pack heat exchanger interface configured to be connected to the battery pack heat exchanger is disposed on the valve manifold integration module, to heat or cool a battery pack by selecting a corresponding fluid channel.

In an embodiment, the vehicle thermal management system further includes a motor heat exchanger, and the motor heat exchanger interface configured to be connected to the motor heat exchanger is disposed on the valve manifold integration module, to exchange heat with the motor by selecting the corresponding fluid channel.

The present disclosure further provides a vehicle, including a vehicle thermal management system described above.

In the above technical solution, the multiple flow channels are provided inside the valve manifold integration module instead of existing connecting pipes, which is beneficial to reducing the connecting pipes in the thermal management system. The valve manifold having the multiple valves is integrated in the valve manifold integration module, which facilitates maintenance and demounting, and can effectively reduce a number of supports for mounting the valves. Further, the design of the multiple flow channels and the integration of the multiple valves inside the valve manifold integration module is beneficial to reducing the weight of the valve manifold integration module, which is conducive to the light weight design of the vehicle and reduces the costs and fuel consumption. Moreover, fewer parts are used, which is beneficial to reducing the arrangement space of the vehicle. Furthermore, the multiple flow channels may be designed flexibly in the valve manifold integration module, so that positions of the valves can be selected flexibly, so as to adapt to the configuration of different vehicles, which is conducive to a platform-based design of the vehicle.

Other features and advantages of the present disclosure will be described in detail in the following detailed description part.

BRIEF DESCRIPTION OF THE DRAWINGS

The accompanying drawings provide further understanding of the present disclosure and constitute a part of this description. The accompanying drawings and the embodiments below are used together for explaining the present disclosure rather than constituting a limitation to the present disclosure. In the accompanying drawings.

DETAILED DESCRIPTION

Figure 1:
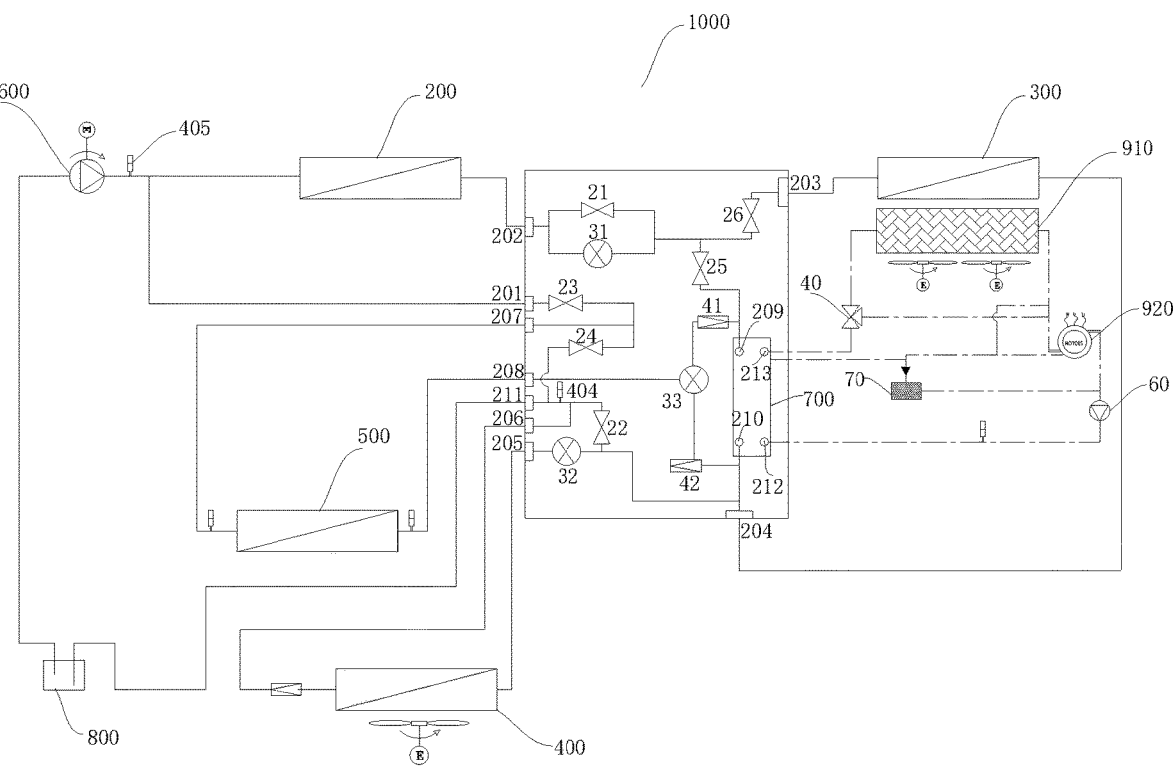
FIG. 1 is a schematic diagram of a vehicle thermal management system according to some embodiments of the present disclosure, in which valves and the like involved in the vehicle thermal management system are integrated.

Embodiments of the present disclosure are described in detail below with reference to the accompanying drawings. It should be understood that the embodiments described herein are merely used to describe and explain the present disclosure, but do not limit the present disclosure.

In the present disclosure, without the contrary explanation, the directional terms such as "upper and lower" are usually defined based on the drawing direction of the corresponding accompanying drawings. "Upper and lower" refers to "upper and lower" sides of the vehicle, and "inside and outside" refers to the inside and outside of relevant parts. In addition, terms "first", "second", etc. are only used for distinguishing descriptions and cannot be understood as indicating or implying relative importance.

In addition, in the description of the present disclosure, it should be noted that unless otherwise explicitly specified or defined, the terms such as "arrange", "connect", and "mount" should be understood in a broad sense. For example, the connection may be a fixed connection, a detachable connection, or an integral connection; or may be a direct connection, an indirect connection through an intermediate medium, or an internal communication between two elements. A person of ordinary skill in the art may understand the meanings of the foregoing terms in the present disclosure according to situations.

As shown in FIG. 1 to FIG. 14, one aspect of the present disclosure provides a valve manifold integration module 100 for a thermal management system 1000. The thermal management system 1000 has multiple preset thermal management modes. The valve manifold integration module 100 includes multiple flow channels 10 and a valve manifold 20. The multiple flow channels 10 are provided inside the valve manifold integration module 100. The valve manifold 20 includes multiple valves. The valves are arranged/disposed on the valve manifold integration module 100. The valves communicate with the flow channels 10. By opening or closing the valves, the multiple flow channels 10 are allowed to communicate with each other to form different fluid channels, thereby realizing at least one of the multiple preset thermal management modes.

In the above technical solution, the multiple flow channels are provided inside the valve manifold integration module 100 instead of existing connecting pipes, which is beneficial to reducing the connecting pipes in the thermal management system 1000. The valve manifold 20 having the multiple valves is integrated in the valve manifold integration module 100, which facilitates maintenance and demounting and can effectively reduce a number of supports for mounting the valves. Besides, the design of the multiple flow channels 10 and the integration of the multiple valves inside the valve manifold integration module 100 is also beneficial to reducing the weight of the valve manifold integration module 100, which is beneficial to reducing the weight of the vehicle and reducing the costs and fuel consumption. Moreover, fewer parts are used, which is beneficial to reducing the configured space of the vehicle. Furthermore, the multiple flow channels may be designed flexibly in the valve manifold integration module 100, so that positions of the valves can be selected flexibly, so as to adapt to the configuration of different vehicles, which is conducive to platform-based design of the vehicle.

In some embodiments, the flow channels include at least one first flow channel 110 and at least one second flow channel 120. The first flow channels 110 are substantially distributed in a same plane. The second flow channels 120 are distributed in different planes. The valve manifold is configured to selectively allow communication between the first flow channels 110 and the second flow channels 120 to form different fluid channels.

The first flow channels are 110 substantially arranged/disposed in the same plane, which facilitates production and later maintenance. The second flow channels 120 are arranged/disposed in different planes, and the valve manifold can selectively allow the communication between the first flow channels 110 and the second flow channels 120 to form multiple different fluid channels, so as to adapt to different models, thereby improving the adaptability of the valve manifold integration module 100. For example, there are multiple first flow channels 110, and there are multiple second flow channels 120. The valve manifold selectively allows the communications between the multiple first flow channels 110 and the multiple second flow channels 120, so as to further satisfy the use of different models.

Referring to FIG. 3, FIG. 5, FIG. 6, FIG. 8, and FIG. 11, the valve manifold integration module 100 may include a first half body 1 and a second half body 2. The first half body 1 includes a first connection surface 1001. The second half body 2 includes a second connection surface 2001. The first connection surface 1001 is hermetically connected to the second connection surface 2001.

The multiple second flow channels 120 are provided inside the first half body 1, and the second connection surface 2001 of the second half body 2 is provided with at least one groove, such that the groove on the second connection surface 2001 and the first connection surface 1001 jointly define the first flow channels 110. When the first half body 1 and the second half body 2 are attached to each other, the first connection surface 1001 of the first half body 1 covers the groove on the second connection surface 2001 of the second half body 2, and the part of the first connection surface 1001 covering an opening of the groove and a wall of the groove form the first flow channel 110.

The first flow channels 110 are defined between the first half body 1 and the second half body 2, the multiple second flow channels 120 are provided inside the first half body 1, and the valve manifold can selectively allow the communication between the first flow channels 110 and the second flow channels 120. In this way, a fluid may flow in the fluid channel formed by the first flow channels 110 and the second flow channels 120 corresponding to the valves.

That is, one first flow channel 110 may communicate with multiple second flow channels 120 to form the fluid channel, and multiple second flow channels 120 may share one first flow channel 110. This can reduce a number of flow channels provided in the valve manifold integration module 100. On the one hand, the internal structure of the valve manifold integration module 100 is simplified, which facilitates fabrication of the valve manifold integration module 100. On the other hand, the problems of messy configuration, low integration level of the valve manifold integration module 100 and large space occupied by the valve manifold integration module 100 due to too many flow channels can be avoided.

In addition, forming one or more grooves on the second connection surface 2001 of the second half body 2 has the following advantages.

First, since the groove is formed on the second connection surface 2001 of the second half body 2, the second half body 2 is simple in structure, so that in a case that there are multiple grooves, it is more convenient and flexible to arrange/dispose and distribute the grooves. Therefore, the second half body 2 can be utilized to a greater extent, which improves the integration level of the valve manifold integration module 100. Besides, arranging/disposing the multiple grooves on the same surface is convenient for later maintenance.

Second, the groove is arranged in the second half body 2, and the second half body 2 is arranged independently from the first half body 1. Therefore, the design of the groove does not affect the design and distribution of the second flow channels 120 in the first half body 1, and there is no need to avoid the second flow channels 120 in the first half body 1 when providing the grooves in the second half body 2, so that the distribution of the second flow channels 120 in the first half body 1 can be utilized more reasonably.

In some embodiments, the multiple second flow channels 120 are provided inside the first half body 1, and the first connection surface 1001 of the first half body 1 is provided with at least one groove, such that the second connection surface 2001 and the groove on the first half body 1 jointly define the first flow channels 110. When the first half body 1 and the second half body 2 are attached to each other, the second connection surface 2001 of the second half body 2 covers the groove on the first connection surface 1001 of the first half body 1, and the part of the second connection surface 2001 covering an opening of the groove and a wall of the groove form the first flow channel 110.

In this solution, both the second flow channels 120 and the groove are provided in the first half body 1, and the first flow channels 110 are defined jointly by the first half body 1 and the second half body 2. In this way, the main structure may be concentrated on the first half body 1, and in a case of damage, the main maintenance may be carried out only in the first half body 1. The second half body 2 is high in design freedom, so that a designer can set the shape and size of the second half body 2 according to different configured spaces of different models.

In another variant solution, the multiple second flow channels 120 are provided inside the first half body 1, the second connection surface 2001 of the second half body 2 is provided with at least one groove, and the first connection surface 1001 of the first half body 1 is provided with at least one groove. In this way, when the first half body 1 and the second half body 2 are attached to each other, the first flow channels 110 may also be defined. The present disclosure does not limit the design method.

In order to adapt to different mounting cases and utilize the space of the second half body 2 more reasonably, in some embodiments provided in the present disclosure, the groove is a curved groove or a straight groove.

Figure 6:
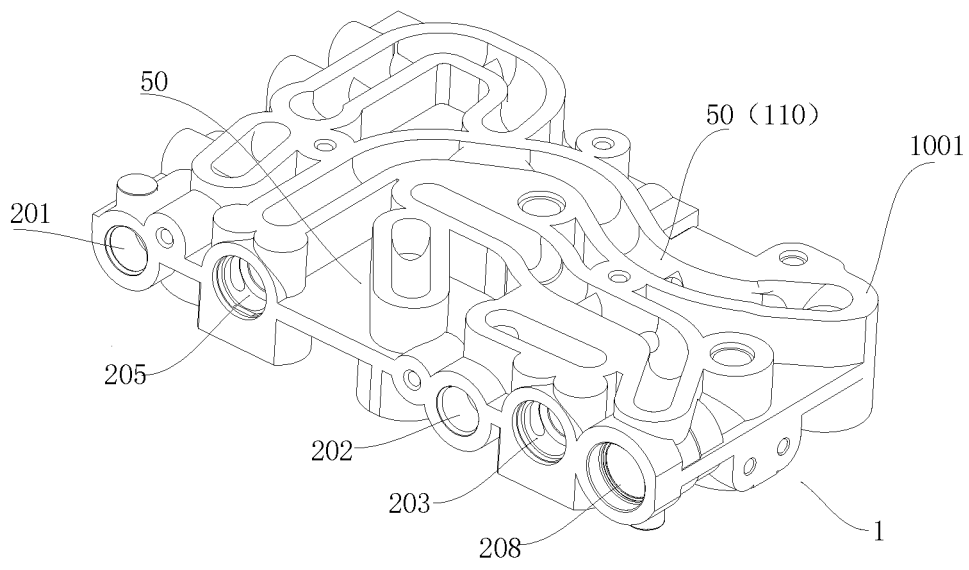
FIG. 6 is a schematic three-dimensional structural view of a first half body of the valve manifold integration module for a thermal management system according to some embodiments of the present disclosure, in which multiple first flow channels are shown.
Figures 7, 8:
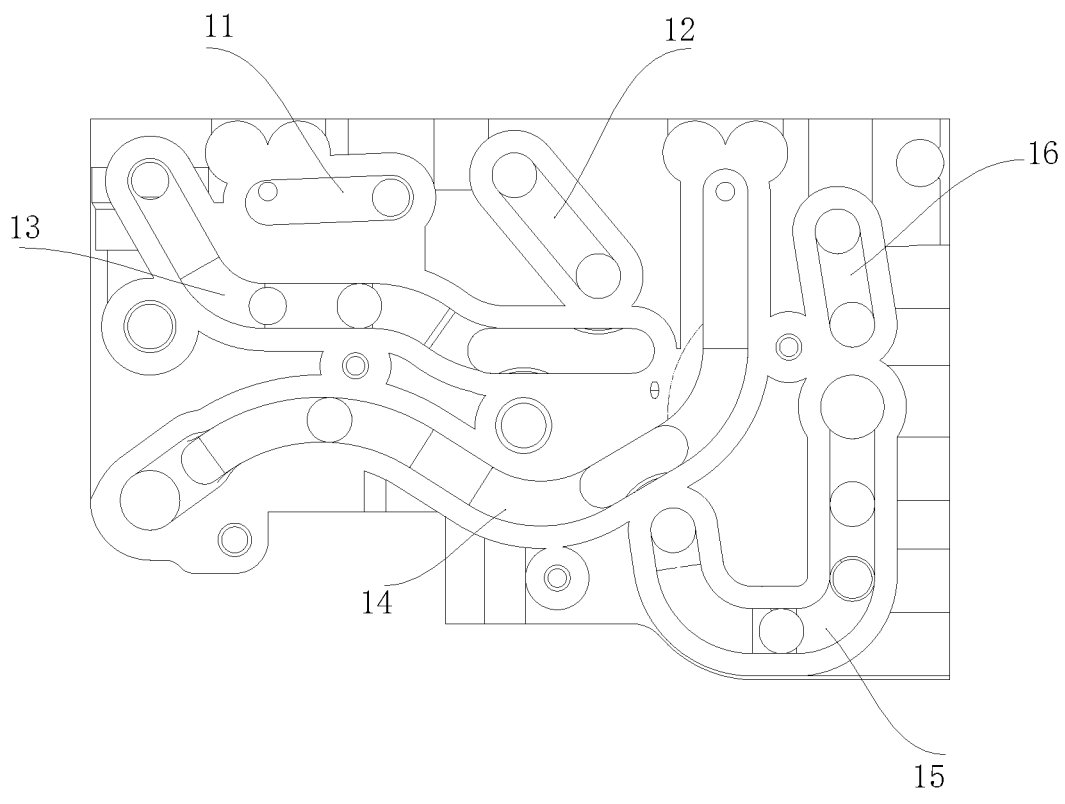
FIG. 7 and FIG. 8 are top views of FIG. 6.

As shown in FIG. 6 and FIG. 7, in a case that the groove is a straight groove, in order to reduce resistance of the fluid flowing in the first flow channels 110, an included angle θ of the curved groove at the bend may be 50° to 180°. In this way, while the fluid flows in the groove, there is a small flow resistance between the fluid and the groove, so that the fluid can flow in the groove more smoothly, and energy consumption of the fluid in the flow process can be reduced. Preferably, the included angle θ may be 90° to 180°.

It should be noted here that when the included angle at the bend of the curved groove is 180°, the groove is constructed as a straight groove.

In an embodiment, a cross section of the groove is U-shaped with a rounded transition. On the one hand, the U-shaped groove is more easily fabricated. On the other hand, the groove with the rounded transition can reduce the flow resistance of the fluid flowing in the groove, so that the fluid can flow in the first flow channels 110 more smoothly.

The first half body 1 and the second half body 2 may be constructed in any suitable shape and structure, as long as the corresponding functions can be realized, which is not limited in the present disclosure.

In order to improve airtightness between the first half body 1 and the second half body 2, a sealing film may be arranged/disposed between the first half body 1 and the second half body 2.

In an embodiment, the first half body 1 and the second half body 2 may be connected by welding to ensure the stability of connection between the first half body 1 and the second half body 2. However, the present disclosure does not limit the connection method between the first half body 1 and the second half body 2. The first half body and the second half body may also be connected by a snap fit or bonding, as long as the stability of connection can be ensured.

In an embodiment, referring to FIG. 6, multiple hollow portions 50 are formed in the first half body 1, thereby effectively reducing the weight of the first half body 1. This facilitates the light weight design of the first half body 1 and the light weight design of the valve manifold integration module 100, thereby further facilitating the light weight design of the vehicle.

In an embodiment, the valve manifold integration module 100 further includes an interface. The interface is configured to connect the fluid channel to an external heat exchange component in the thermal management system 1000. The interface arranged/disposed on the valve manifold integration module 100 can directly realize the communication between the fluid channel in the valve manifold integration module 100 and the external heat exchange component in the thermal management system 1000 without connection through structures such as intermediate adapters, thereby reducing the risk of leakage of the valve manifold integration module 100.

For example, the interface may include more than one of a condenser interface, an air-conditioning heat exchanger interface, an evaporator interface, a battery pack heat exchanger interface, a motor heat exchanger interface, an engine heat exchanger interface, a compressor interface, a gas-liquid separator interface, and a PT sensor interface. The condenser interface, the air-conditioning heat exchanger interface, the evaporator interface, the battery pack heat exchanger interface, the motor heat exchanger interface and the compressor interface are configured to be connected to corresponding external thermal management system components. It should be noted here that the corresponding thermal management system components may include: a condenser 200, an air-conditioning heat exchanger 300, an evaporator 400, a battery pack heat exchanger 500, a motor heat exchanger 700, and a compressor 600.

In an embodiment, the condenser interface is configured to be connected to the condenser 200. The air-conditioning heat exchanger interface is configured to be connected to the air-conditioning heat exchanger 300. The evaporator interface is configured to be connected to the evaporator 400. The battery pack heat exchanger interface is configured to be connected to the battery pack heat exchanger 500. The motor heat exchanger interface is configured to be connected to the motor heat exchanger 700. The compressor interface is configured to be connected to the compressor 600.

The valve manifold integration module 100 is provided with the interface for communication with the external thermal management system components, so that the fluid channel in the valve manifold integration module 100 can communicate with the external thermal management system components, thereby realizing different preset thermal management modes. In addition, the use of the fluid channel inside the valve manifold integration module 100 instead of the existing connecting pipes can reduce a number of pipes, which is conducive to the light weight design.

In some embodiments, the interface may include the condenser interface, the air-conditioning heat exchanger interface, the evaporator interface, and the compressor interface. The condenser interface is configured to be connected to the condenser 200 in the external thermal management system 1000. The air-conditioning heat exchanger interface is configured to be connected to the air-conditioning heat exchanger 300 in the external thermal management system 1000. The evaporator interface is configured to be connected to the evaporator 400 in the external thermal management system 1000. The compressor interface is configured to be connected to the compressor 600 in the external thermal management system 1000. Of course, the present disclosure does not limit the type of interfaces on the valve manifold integration module 100, which may be set by the designer according to needs.

Figure 2:
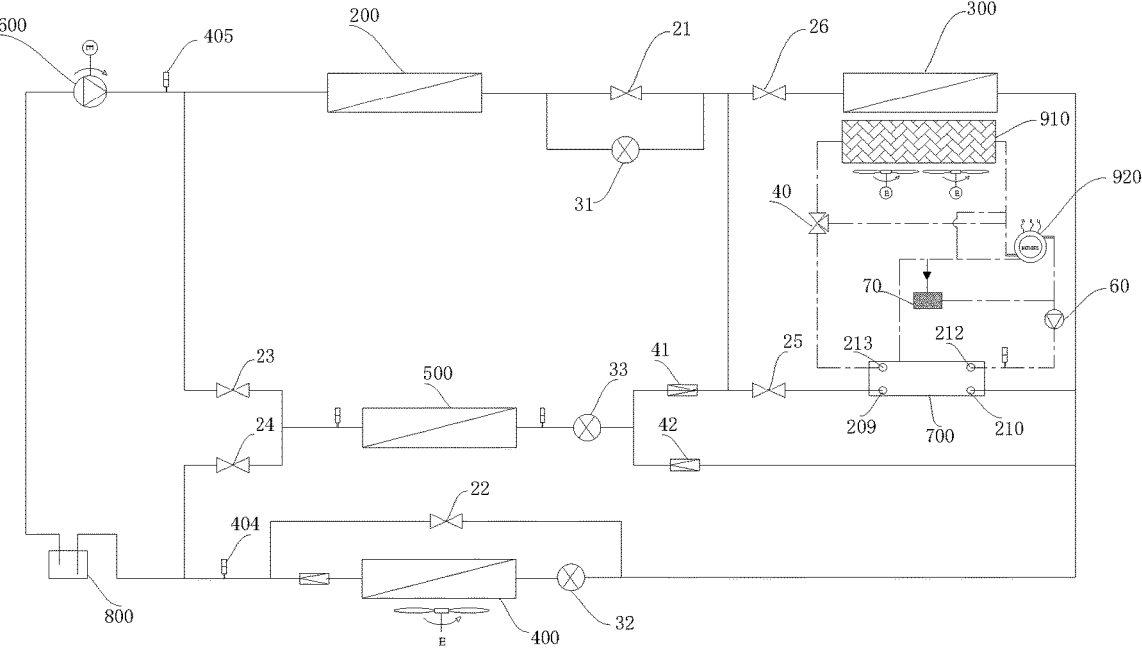
FIG. 2 is a schematic diagram of the vehicle thermal management system according to some embodiments of the present disclosure.

In an embodiment, referring to FIG. 1 and FIG. 2, the condenser interface may include a condenser outlet interface 202. The air-conditioning heat exchanger interface includes an air-conditioning heat exchanger inlet interface 203 and an air-conditioning heat exchanger outlet interface 204. The evaporator interface includes an evaporator inlet interface 205. The valve manifold includes a first switch valve 21 and a second expansion valve 32. A first port of the first switch valve 21 is connected to the condenser outlet interface 202, and a second port of the first switch valve 21 is connected to the air-conditioning heat exchanger inlet interface 203. A first port of the second expansion valve 32 is connected to the air-conditioning heat exchanger outlet interface 204, and a second port of the second expansion valve 32 is connected to the evaporator inlet interface 205, such that the thermal management system 1000 realizes an air-conditioning cooling mode in the preset thermal management modes.

In the above technical solution, compared with the existing air-conditioning cooling mode, the condenser outlet interface 202 and the air-conditioning heat exchanger inlet interface 203 are arranged/disposed on the valve manifold integration module 100, and the fluid channel communicating the condenser outlet interface 202 with the air-conditioning heat exchanger inlet interface 203 is provided inside the valve manifold integration module 100, so that the fluid channel can be used instead of the connecting pipe for allowing the communication between the condenser 200 and the air-conditioning heat exchanger 300 in the related art. Moreover, the air-conditioning heat exchanger outlet interface 204 and the evaporator inlet interface 205 are integrated in the valve manifold integration module 100, and there must be the fluid channel communicating the air-conditioning heat exchanger outlet interface 204 with the evaporator inlet interface 205 inside the valve manifold integration module 100, so that the fluid channel can be used instead of a communicating pipe for allowing the communication between the air-conditioning heat exchanger 300 and the evaporator 400 in the related art. The first switch valve 21 and the second expansion valve 32 communicate with the fluid channel so as to control a flow path, which will be described in detail when the structure of the first flow channels 110 is introduced below.

In an embodiment, in the air-conditioning cooling mode, the working process may be as follows:

As shown in FIG. 1 and FIG. 2, a high-temperature high-pressure gaseous refrigerant is discharged from the compressor 600, and flows to an inlet of the condenser 200 through a pipe. Through the communication between an outlet of the condenser 200 (the condenser 200 may not release heat in this case) and the condenser outlet interface 202 on the valve manifold integration module 100, the refrigerant enters the fluid channel. The first switch valve 21 communicating with the fluid channel is arranged/disposed in the valve manifold integration module 100. The first switch valve 21 is in an open state, and the refrigerant flows to the air-conditioning heat exchanger inlet interface 203 through the first switch valve 21. The air-conditioning heat exchanger inlet interface 203 communicates with an inlet of the air-conditioning heat exchanger 300. The refrigerant enters the air-conditioning heat exchanger 300 to exchange heat. The heat-exchanged refrigerant flows out from an outlet of the air-conditioning heat exchanger 300 to the air-conditioning heat exchanger outlet interface 204, and enters the fluid channel of the valve manifold integration module 100 again. The second expansion valve 32 communicating with the fluid channel is arranged/disposed in the valve manifold integration module 100. After being throttled and depressurized through the second expansion valve 32, the refrigerant flows to the evaporator inlet interface 205. The evaporator inlet interface 205 may communicate with an inlet of the evaporator 400 through a pipe. The throttled and depressurized refrigerant enters the evaporator 400 through the pipe to be evaporated so as to absorb ambient heat. After the ambient temperature is lowered, cold air is blown into a passenger compartment by a blower to realize cooling. The refrigerant passing through the evaporator 400 flows to the compressor 600 through a pipe, so that the gaseous refrigerant enters the compressor 600 to realize cooling cycles.

Referring to FIG. 1 and FIG. 2, the valve manifold may further include a first expansion valve 31 and a second switch valve 22. A first port of the first expansion valve 31 is connected to the condenser outlet interface 202, and a second port of the first expansion valve 31 is connected to the air-conditioning heat exchanger inlet interface 203. A first port of the second switch valve 22 is connected to the air-conditioning heat exchanger outlet interface 204, and a second port of the second switch valve 22 is connected to an inlet of the compressor 600, such that the thermal management system 1000 realizes an air-conditioning heating mode in the preset thermal management modes.

That is, by adding the first expansion valve 31 and the second switch valve 22 to the valve manifold integration module 100 on the basis of the structure for realizing the air-conditioning cooling mode, and an air-conditioning heating mode in the preset thermal management modes. Similarly, in the air-conditioning heating mode, the fluid channel in the valve manifold integration module 100 may also be used instead of a connecting pipe for allowing the communication between the condenser 200 and the air-conditioning heat exchanger 300 in the related art, and a communicating pipe for allowing the communication between the air-conditioning heat exchanger 300 and the evaporator 400 in the related art, which reduces a number of connecting pipes in the air-conditioning heating mode and is conducive to the light weight design.

In an embodiment, in the air-conditioning heating mode, the working process may be as follows:

Referring to FIG. 1 and FIG. 2, the high-temperature high-pressure gaseous refrigerant is discharged from the compressor 600. The high-temperature high-pressure gaseous refrigerant may enter the condenser 200 through a pipe. The refrigerant releases heat in the condenser 200. The heat released by the condenser 200 is combined with air to heat a PTC, and the hot air is blown into the vehicle by the blower, thereby heating the inside of the vehicle. The refrigerant passing through the condenser 200 enters the fluid channel of the valve manifold integration module 100 through the condenser outlet interface 202 on the valve manifold integration module 100. The valve manifold integration module 100 is provided with the first expansion valve 31 and the second switch valve 22 communicating with the fluid channel. The refrigerant is throttled and depressurized through the first expansion valve 31 and flows to the air-conditioning heat exchanger inlet interface 203. The air-conditioning heat exchanger inlet interface 203 may communicate with the air-conditioning heat exchanger 300 through a pipe. The refrigerant enters the air-conditioning heat exchanger 300 to exchange heat. The heat-exchanged refrigerant enters the fluid channel of the valve manifold integration module 100 through the communication with the air-conditioning heat exchanger outlet interface 204 through a pipe. Next, the refrigerant flows to the inlet of the compressor 600 through the second switch valve 22, so that the gaseous refrigerant enters the compressor 600 to realize heating cycles.

Referring to FIG. 1 and FIG. 2, the battery pack heat exchanger interface may include a battery pack heat exchanger first interface 207 and a battery pack heat exchanger second interface 208. The valve manifold may further include a third expansion valve 33 and a fourth switch valve 24. A first port of the third expansion valve 33 is connected to the battery pack heat exchanger second interface 208, and a second port of the third expansion valve 33 is connected to the air-conditioning heat exchanger outlet interface 204. A first port of the fourth switch valve 24 is connected to the battery pack heat exchanger first interface 207, and a second port of the fourth switch valve 24 is configured to be connected to an inlet of the compressor, such that the thermal management system 1000 realizes a battery cooling mode, or air-conditioning cooling and battery cooling modes in the preset thermal management modes.

That is, by adding the battery pack heat exchanger first interface 207, the battery pack heat exchanger second interface 208, the third expansion valve 33, and the fourth switch valve 24 to the valve manifold integration module 100 on the basis of the structure for realizing the air-conditioning cooling mode, the battery cooling mode, or the air-conditioning cooling and battery cooling modes in the preset thermal management modes, which reduces a number of connecting pipes in the battery cooling mode, and the air-conditioning cooling and battery cooling modes.

In an embodiment, in the battery cooling mode, the working process may be as follows:

Referring to FIG. 1 and FIG. 2, the high-temperature high-pressure gaseous refrigerant is discharged from the compressor 600 and flows to the inlet of the condenser 200 through the pipe. The refrigerant enters the fluid channel through the communication between the outlet of the condenser 200 (the condenser 200 may not release heat in this case) and the condenser outlet interface 202 on the valve manifold integration module 100. The refrigerant flows into the air-conditioning heat exchanger 300 through the first switch valve 21 to exchange heat. The heat-exchanged refrigerant is throttled and depressurized through the third expansion valve 33, and flows to the battery pack heat exchanger 500 so as to absorb heat and cool the battery pack. The refrigerant passing through the battery pack heat exchanger 500 flows to the compressor 600 through the fourth switch valve 24 so as to realize battery cooling cycles. In the battery cooling mode, the second expansion valve 32 is in a closed state.

In an embodiment, in the air-conditioning cooling and battery cooling modes, the working process may be as follows:

Referring to FIG. 1 and FIG. 2, the high-temperature high-pressure gaseous refrigerant is discharged from the compressor 600 and flows to the inlet of the condenser 200 through the pipe. The refrigerant enters the fluid channel through the communication between the outlet of the condenser 200 (the condenser 200 may not release heat in this case) and the condenser outlet interface 202 on the valve manifold integration module 100. The refrigerant flows into the air-conditioning heat exchanger 300 through the first switch valve 21 to exchange heat. The heat-exchanged refrigerant is divided into two parts. One part is throttled and depressurized through the third expansion valve 33, and flows to the battery pack heat exchanger 500 so as to absorb heat and cool the battery pack. The refrigerant passing through the battery pack heat exchanger 500 flows to the compressor 600 through the fourth switch valve 24 so as to realize battery cooling cycles. The other part of the refrigerant is throttled and depressurized through the second expansion valve 32 and flows to the evaporator inlet interface 205. The evaporator inlet interface 205 may communicate with the inlet of the evaporator 400 through the pipe. The throttled and depressurized refrigerant enters the evaporator 400 through the pipe to be evaporated so as to absorb ambient heat. After the ambient temperature is lowered, cold air is blown into a member compartment by a blower to realize cooling. The refrigerant passing through the evaporator 400 flows to the compressor 600 through the pipe, so that the gaseous refrigerant enters the compressor 600 to realize air-conditioning cooling cycles.

Referring to FIG. 1 and FIG. 2, the compressor interface may include a compressor outlet interface 201, and the motor heat exchanger interface includes a motor heat exchanger first interface 209 and a motor heat exchanger second interface 210. The valve manifold further includes a third switch valve 23. A first port of the third switch valve 23 is connected to the compressor outlet interface 201, and a second port of the third switch valve 23 is connected to the battery pack heat exchanger first interface 207. A second port of the third expansion valve 33 is connected to the motor heat exchanger first interface 209. A first port of the second switch valve 22 is connected to the motor heat exchanger second interface 210, and a second port of the second switch valve 22 is configured to be connected to the inlet of the compressor 600, such that the thermal management system 1000 realizes a battery heating mode, or air-conditioning cooling and battery heating modes in the preset thermal management modes.

By adding the compressor outlet interface 201, the motor heat exchanger first interface 209, the motor heat exchanger second interface 210, and the third switch valve 23 to the valve manifold integration module 100 on the basis of the structure that can realize the battery cooling mode, or the air-conditioning cooling and battery cooling modes in the preset thermal management modes, the battery heating mode, or the air-conditioning cooling and battery heating modes can be realized by opening or closing the valves and opening or closing the fluid channel, which reduces a number of connecting pipes in the battery heating mode, or the air-conditioning cooling and battery heating modes.

In an embodiment, in the battery heating mode, the working process may be as follows:

Referring to FIG. 1 and FIG. 2, the high-temperature high-pressure refrigerant flows out from the compressor 600 to the third switch valve 23 through a pipe. The third switch valve 23 may communicate with the battery pack heat exchanger 500 and the fourth switch valve 24 through pipes. In this case, the third switch valve 23 is in an open state, and the fourth switch valve 24 is in a closed state. The refrigerant enters the battery pack heat exchanger 500 to heat the battery pack. The refrigerant passing through the battery pack heat exchanger 500 enters the third expansion valve 33 through a pipe so as to be throttled and depressurized. The throttled and depressurized refrigerant enters the motor heat exchanger 700 to exchange heat. The refrigerant passing through the motor heat exchanger 700 enters the compressor through the second switch valve 22 to realize battery heating cycles.

In an embodiment, in the air-conditioning cooling and battery heating modes, the working process may be as follows:

Referring to FIG. 1 and FIG. 2, the high-temperature high-pressure refrigerant flows out from the compressor 600 and is divided into two parts:

One part enters the condenser 200 through a pipe. After passing through the condenser 200 (the condenser 200 may not release heat in this case), the refrigerant may flow to the first switch valve 21. The first switch valve 21 is in an open state. The refrigerant thereby enters the air-conditioning heat exchanger 300. The heat-exchanged refrigerant enters the second expansion valve 32 through a pipe. After being throttled and depressurized through the second expansion valve 32, the refrigerant flows to the evaporator 400. The throttled and depressurized refrigerant enters the evaporator 400 through the pipe to be evaporated so as to absorb ambient heat. After the ambient temperature is lowered, cold air is blown into the member compartment by the blower to realize cooling. The refrigerant passing through the evaporator 400 flows to the compressor 600 through the pipe, so that the gaseous refrigerant enters the compressor 600 to realize air-conditioning cooling cycles.

The other part enters the third switch valve 23 through the pipe. The refrigerant passing through the third switch valve 23 enters the battery pack heat exchanger 500. The refrigerant entering the battery pack heat exchanger 500 heats a battery pack. The refrigerant passing through the battery pack heat exchanger 500 enters the third expansion valve 33 through the pipe so as to be throttled and depressurized. The throttled and depressurized refrigerant enters the motor heat exchanger 700 to exchange heat. The refrigerant passing through the motor heat exchanger 700 enters the compressor through the second switch valve 22 to realize battery heating cycles.

Referring to FIG. 1 and FIG. 2, the valve manifold further includes a first expansion valve 31. A first port of the first expansion valve 31 is connected to the condenser outlet interface 202, and a second port of the first expansion valve 31 is connected to the motor heat exchanger first interface 209, such that the thermal management system 1000 realizes a heat pump heating mode, or heat pump heating and battery cooling modes, or heat pump heating and battery heating modes in the preset thermal management modes.

In an embodiment, in the heat pump heating mode, the working process may be as follows:

Referring to FIG. 1 and FIG. 2, the refrigerant flowing out from the compressor 600 enters the condenser 200 through a pipe. The refrigerant releases heat in the condenser 200. The heat released by the condenser 200 is combined with air to heat the PTC. The hot air is blown into the vehicle by the blower so as to heat the inside of the vehicle. The refrigerant passing through the condenser 200 enters the first expansion valve 31 so as to be throttled and depressurized. The throttled and depressurized refrigerant enters the motor heat exchanger 700 to absorb heat and be evaporated. The evaporated refrigerant flows through the second switch valve 22 and enters the compressor 600 to realize heating cycles.

In an embodiment, in the heat pump heating and battery cooling modes, the working process may be as follows:

Referring to FIG. 1 and FIG. 2, the refrigerant flowing out from the compressor 600 enters the condenser 200 through a pipe. The refrigerant releases heat in the condenser 200. The heat released by the condenser 200 is combined with air to heat the PTC. The hot air is blown into the vehicle by the blower so as to heat the inside of the vehicle. The refrigerant passing through the condenser 200 enters the first expansion valve 31 through the pipe. After being throttled and depressurized by the first expansion valve 31, the refrigerant enters the motor heat exchanger 700. The refrigerant passing through the motor heat exchanger 700 absorbs heat and is evaporated. The evaporated refrigerant enters the third expansion valve 33. The refrigerant entering the third expansion valve 33 is throttled and depressurized, and then enters the battery pack heat exchanger 500 to absorb heat and cool the battery pack. The refrigerant passing through the battery pack heat exchanger 500 passes through the fourth switch valve 24. The refrigerant enters the compressor through the opened fourth switch valve 24, thereby realizing the cycles of the heat pump heating and battery cooling modes.

In an embodiment, in the heat pump heating and battery heating modes, the working process may be as follows:

Referring to FIG. 1 and FIG. 2, the refrigerant flows out from the compressor and is divided into two parts:

One part enters the condenser 200 through the pipe. The refrigerant releases heat in the condenser 200. The heat released by the condenser 200 is combined with air to heat the PTC so as to heat the inside of the vehicle. The refrigerant passing through the condenser 200 enters the first expansion valve 31. The first expansion valve 31 throttles and depressurizes the refrigerant. The refrigerant flowing out from the first expansion valve 31 enters the motor heat exchanger 700. The refrigerant absorbs heat and is evaporated in the motor heat exchanger 700, and enters the compressor through the second switch valve 22.

The other part enters the third switch valve 23 through the pipe. The refrigerant passing through the third switch valve 23 enters the battery pack heat exchanger 500 to heat the battery pack. The refrigerant passing through the battery pack heat exchanger 500 enters the third expansion valve 33 so as to be throttled and depressurized. The throttled and depressurized refrigerant also enters the motor heat exchanger 700 to absorb heat and be evaporated. The evaporated refrigerant enters the compressor through the second switch valve 22.

Referring to FIG. 1 and FIG. 2, the motor heat exchanger second interface 210 is further connected to the first port of the second expansion valve 32, such that the thermal management system 1000 realizes air-conditioning cooling, air-conditioning dehumidifying, and battery heating modes, or air-conditioning cooling, air-conditioning dehumidifying, and battery cooling modes in the preset thermal management modes.

In an embodiment, in the air-conditioning dehumidifying mode, the working process may be as follows:

Referring to FIG. 1 and FIG. 2, the high-temperature high-pressure gaseous refrigerant is discharged from the compressor 600 and enters the condenser 200. The refrigerant releases heat in the condenser 200 and then enters the first switch valve 21. In this case, the first switch valve 21 is fully opened. The refrigerant passing through the first switch valve 21 enters the air-conditioning heat exchanger 300 and the motor heat exchanger 700. The refrigerant that has exchanged heat in the air-conditioning heat exchanger 300 or the motor heat exchanger 700 enters the second expansion valve 32 so as to be throttled and depressurized. The throttled and depressurized refrigerant enters the evaporator 400 and absorbs ambient heat in the vehicle, so that humid air in the vehicle reaches the dew point temperature and condenses into water which is discharged, thereby achieving a dehumidification effect. The dehumidified air and the heat released by the condenser 200 make the environment in the vehicle reach a comfortable temperature. The air is blown into the passenger compartment by the blower to realize a comfortable ambient temperature in the passenger compartment. The refrigerant passing through the evaporator 400 enters the compressor to realize dehumidification cycles.

In an embodiment, in the air-conditioning cooling, air-conditioning dehumidifying, and battery cooling modes, the working process may be as follows:

Referring to FIG. 1 and FIG. 2, the high-temperature high-pressure gaseous refrigerant is discharged from the compressor 600, and enters the condenser 200 through the pipe. After passing through the condenser 200 (the condenser 200 may not release heat in this case), the refrigerant enters the first switch valve 21 through the pipe. In this case, the first switch valve 21 is fully opened. The refrigerant passing through the switch valve 21 enters the air-conditioning heat exchanger 300. The heat-exchanged refrigerant is divided into two parts:

One part enters the second expansion valve 32 through the pipe so as to be throttled and depressurized. The throttled and depressurized refrigerant enters the evaporator 400 through the pipe and absorbs ambient heat in the, so that humid air in the vehicle reaches the dew point temperature and condenses into water which is discharged, thereby achieving a dehumidification effect. The dehumidified air and the heat released by the condenser 200 make the environment in the vehicle reach a comfortable temperature. The air is blown into the passenger compartment by the blower to realize a comfortable ambient temperature in the passenger compartment. The refrigerant passing through the evaporator 400 enters the compressor 600.

The other part of the refrigerant discharged from the air-conditioning heat exchanger 300 enters the third expansion valve 33. The refrigerant entering the third expansion valve 33 is throttled and depressurized, and then enters the battery pack heat exchanger 500 to absorb heat and cool the battery pack. The refrigerant passing through the battery pack heat exchanger 500 enters the compressor 600 through the fourth switch valve 24.

In an embodiment, in the air-conditioning cooling, air-conditioning dehumidifying, and battery heating modes, the working process may be as follows:

Referring to FIG. 1 and FIG. 2, the high-temperature high-pressure gaseous refrigerant is discharged from the compressor 600 and divided into two parts:

A first part enters the condenser 200 through the pipe. After releasing heat in the condenser 200, the refrigerant flows to the first switch valve 21 through the pipe. In this case, the first switch valve 21 is fully opened. The refrigerant passing through the first switch valve 21 enters the air-conditioning heat exchanger 300 through the pipe. The refrigerant that has exchanged heat in the air-conditioning heat exchanger 300 enters the second expansion valve 32 through the pipe. After being throttled and depressurized in the second expansion valve 32, the refrigerant enters the evaporator 400 and absorbs ambient heat in the vehicle, so that humid air in the vehicle reaches the dew point temperature and condenses into water which is discharged, thereby achieving a dehumidification effect. The dehumidified air and the heat released by the condenser 200 make the environment in the vehicle reach a comfortable temperature. The air is blown into the passenger compartment by the blower to realize a comfortable ambient temperature in the passenger compartment. The refrigerant passing through the evaporator 400 enters the compressor 600 through the pipe.

A second part enters the third switch valve 23 through the pipe. The refrigerant passing through the third switch valve 23 enters the battery pack heat exchanger 500 to heat the battery pack. The refrigerant passing through the battery pack heat exchanger 500 enters the third expansion valve 33 through the pipe so as to be throttled and depressurized. The throttled and depressurized refrigerant enters the motor heat exchanger 700 to absorb heat and be evaporated. The evaporated refrigerant also enters the second expansion valve 32 through the pipe, and converges with the first part of the refrigerant.

In some embodiments, referring to FIG. 1 and FIG. 2, the valve manifold further includes a fifth switch valve 25 and a sixth switch valve 26. A first port of the fifth switch valve

25 is connected to the second port of the first switch valve 21 and the second port of the first expansion valve 31, and a second port of the fifth switch valve 25 is connected to the motor heat exchanger first interface 209. A first port of the sixth switch valve 26 is connected to the second port of the first switch valve 21 and the second port of the first expansion valve 31, and a second port of the sixth switch valve 26 is configured to be connected to the air-conditioning heat exchanger inlet interface 203. By integrating the fifth switch valve 25 in the valve manifold integration module 100, the refrigerant flowing out from the first switch valve 21 and the first expansion valve 31 may be selectively allowed to enter the air-conditioning heat exchanger 300, thereby improving the flexibility in flow path control. Similarly, by integrating the sixth switch valve 26 in the valve manifold integration module 100, the refrigerant flowing out from the first switch valve 21 and the first expansion valve 31 may also be selectively allowed to enter the motor heat exchanger 700, thereby improving the flexibility in flow path control.

Referring to FIG. 1, the valve manifold may further include a first one-way valve 41 and a second one-way valve 42. A first port of the first one-way valve 41 is connected to the second port of the third expansion valve 33, and a second port of the first one-way valve 41 is configured to be connected to the motor heat exchanger first interface 209, and may be connected to the first port of the fifth switch valve 25. The first one-way valve 41 is configured to allow a fluid to flow only from the first port to the second port of the first one-way valve. A first port of the second one-way valve 42 is connected to the air-conditioning heat exchanger outlet interface 204, and a second port of the second one-way valve 42 is connected to the second port of the third expansion valve 33. The second one-way valve 42 is configured to allow the fluid to flow only from the first port to the second port of the second one-way valve. In this embodiment, the first one-way valve 41 and the second one-way valve 42 arranged/disposed in the flow path can prevent the fluid from flowing backward and ensure a steady flow of the fluid in the flow path.

In some embodiments, referring to FIG. 1 and FIG. 2, the gas-liquid separator interface includes a gas-liquid separator inlet interface 211, and the evaporator interface further includes an evaporator outlet interface 206. The evaporator outlet interface 206 is connected to the gas-liquid separator inlet interface 211. That is, the refrigerant passing through the evaporator 400 may flow into the gas-liquid separator 800 to be subjected to gas-liquid separation. The separated gaseous refrigerant enters the compressor 600, thereby preventing the liquid refrigerant or the mixture of the gaseous and liquid refrigerants from entering the compressor 600.

In an embodiment, referring to FIG. 6 to FIG. 14, the flow channels include the first flow channels 110 substantially distributed in the same plane. The first flow channels 110 include a first branch 11. The condenser outlet interface 202 communicates with the first port of the first switch valve 21 and the first port of the first expansion valve 31 through the first branch 11.

That is, in this embodiment, the first branch 11 is provided, the first branch 11 communicates with the condenser outlet interface 202, and the first branch 11 can realize the communication with the first switch valve 21 and the communication with the first expansion valve 31, which avoids providing two separate flow channels to respectively realize the communication between the condenser outlet interface 202 and the first port of the first switch valve 21, and the communication between the condenser outlet interface 202 and the first port 31 the first expansion valve. By sharing the first branch 11, a number of flow channels provided in the valve manifold integration module 100 is reduced.

In an embodiment, a first opening 803 and a second opening 802 are formed in the first branch 11. The first opening 803 communicates with the first port of the first switch valve 21, and the second opening 802 communicates with the first port of the first expansion valve 31. The condenser outlet interface 202 may communicate with the first branch 11 through one of the second flow channels 120.

Referring to FIG. 6, FIG. 7, and FIG. 8, the first flow channels 110 further include a second branch 12. The second port of the first switch valve 21 and the second port of the first expansion valve 31 communicate with the first port of the fifth switch valve 25 through the second branch 12, and the second port of the first switch valve 21 and the second port of the first expansion valve 31 further communicate with the first port of the sixth switch valve 26 through the second branch 12.

That is, in this embodiment, by providing the second branch 12, the refrigerants flowing out from the first switch valve 21 and the first expansion valve 31 may share the second branch 12 to realize the communication with the sixth switch valve 26, the fifth switch valve 25, and the first one-way valve 41, thereby reducing the number of the flow channels provided in the valve manifold integration module 100.

In an embodiment, a third opening 818, a fourth opening 819, a fifth opening 801, a sixth opening 121, and a seventh opening 122 are formed in the second branch 12. The third opening 818 communicates with the second port of the first switch valve 21. The fourth opening 819 communicates with the second port of the first expansion valve 31. The fifth opening 801 communicates with the second port of the first one-way valve 41. The sixth opening 121 communicates with the first port of the sixth switch valve 26. The seventh opening 122 communicates with the first port of the fifth switch valve 25.

In an embodiment, referring to FIG. 6 and FIG. 7, the first flow channels 110 further include a third branch 13. The second port of the sixth switch valve 26 communicates with the air-conditioning heat exchanger inlet interface 203 through the third branch 13, such that the refrigerant flows to the air-conditioning heat exchanger 300.

In an embodiment, an eighth opening 805 and a ninth opening 804 are formed in the third branch 13. The eighth opening 805 communicates with the second port of the sixth switch valve 26. The ninth opening 804 may communicate with the air-conditioning heat exchanger inlet interface 203 through one of the second flow channels 120.

In an embodiment, referring to FIG. 6, FIG. 7, and FIG. 8, the first flow channels 110 further include a fourth branch 14. The air-conditioning heat exchanger outlet interface 204 and the motor heat exchanger second interface 210 communicate with the first port of the second switch valve 22 through the fourth branch 14, and the air-conditioning heat exchanger outlet interface 204 and the motor heat exchanger second interface 210 further communicate with the first port of the second expansion valve 32 through the fourth branch 14.

That is, in this embodiment, the refrigerant flowing out from the air-conditioning heat exchanger 300 and the refrigerant flowing out from the motor heat exchanger 700 converge to the fourth branch 14, and the fourth branch 14 can selectively open or close the second switch valve 22, and selectively open or close the second expansion valve 32. By providing the fourth branch 14, there is no need to separately providing multiple flow channels to realize the communication between the air-conditioning heat exchanger 300, and the second switch valve 22 and the second expansion valve 32, or to realize the communication between the motor heat exchanger 700, and the second switch valve 22 and the second expansion valve 32, thereby reducing the number of the flow channels provided in the valve manifold integration module 100.

In an embodiment, a tenth opening 816, an eleventh opening 817, a twelfth opening 820, and a thirteenth opening 806 are provided in the fourth branch 14. The tenth opening 816 communicates with the air-conditioning heat exchanger outlet interface 204 through one of the second flow channels 120. The eleventh opening 817 communicates with the motor heat exchanger second interface 210 through one of the second flow channels 120. The twelfth opening 820 communicates with the first port of the second switch valve 22. The thirteenth opening 806 communicates with the first port of the second expansion valve 32.

In an embodiment, referring to FIG. 6, FIG. 7, and FIG. 8, the first flow channels 110 further include a fifth branch 15. The second port of the third switch valve 23 and the battery pack heat exchanger first interface 207 communicate with the first port of the fourth switch valve 24 through the fifth branch 15.

That is, in this embodiment, the refrigerant flowing out from the second port of the third switch valve 23 enters the fifth branch 15. The refrigerant flowing into the fifth branch 15 then selectively flows to the fourth switch valve 24 or the battery pack heat exchanger 500. By sharing the fifth branch 15, there is no need to separately provide the flow channel between the third switch valve 23 and the fourth switch valve 24, or separately provide the flow channel between the third switch valve 23 and the battery pack heat exchanger 500, thereby reducing the number of the flow channels in the valve manifold integration module 100.

In an embodiment, a fourteenth opening 807, a fifteenth opening 808, and a sixteenth opening (not shown) are provided in the fifth branch 15. The fourteenth opening 807 communicates with the second port of the third switch valve 23. The fifteenth opening 808 communicates with the first port of the fourth switch valve 24, and the sixteenth opening communicates with the battery pack heat exchanger first interface 207.

In an embodiment, referring to FIG. 6, FIG. 7, and FIG. 8, the first flow channels 110 further include a sixth branch 16. The second port of the second switch valve 22, the evaporator outlet interface 206, and an outlet of the fourth switch valve 24 can communicate with the inlet of the compressor 600 through the sixth branch 16.

That is, in this embodiment, by sharing the sixth branch 16, the second port of the second switch valve 22, the evaporator outlet interface 206, and the second port of the fourth switch valve 24 may communicate with the inlet of the compressor 600, which avoids providing multiple flow channels for allowing the communications respectively, thereby reducing the number of the flow channels provided in the valve manifold integration module 100.

In an embodiment, first, it should be noted that the PT sensor includes a first PT sensor 404 and a second PT sensor 405. The first PT sensor 404 is arranged/disposed at an outlet of the evaporator 400 and the second port of the second switch valve 22, so as to detect a temperature of the refrigerant flowing out from the evaporator 400 or from the second switch valve 22. The second PT sensor 405 is arranged/disposed at the outlet of the compressor 600, so as to detect a temperature of the refrigerant discharged from the compressor 600.

A seventeenth opening 809, an eighteenth opening 810, a nineteenth opening 811, a twentieth opening 812, and a twenty-first opening 813 are provided in the sixth branch 16. The seventeenth opening 809 communicates with the second port of the fourth switch valve 24. The eighteenth opening 810 may communicate with the gas-liquid separator inlet interface 211 through one of the second flow channels 120. The nineteenth opening 811 communicates with a second port of the first PT sensor 404. The twentieth opening 812 communicates with the evaporator outlet interface 206 through one of the second flow channels 120. The twenty-first opening 813 communicates with the second port of the second switch valve 22. The refrigerant flows into the sixth branch 16 through the seventeenth opening 809, the nineteenth opening 811, the twentieth opening 812, and the twenty-first opening 813, and then may flow into the gas-liquid separator 800 through the eighteenth opening 810. After passing through the gas-liquid separator 800, the refrigerant finally flows into the compressor 600.

In an example of the air-conditioning cooling mode, the working process is described as follows in conjunction with the openings described above:

The high-temperature high-pressure gaseous refrigerant is discharged from the compressor 600, and flows to the inlet of the condenser 200 through the pipe. After exchanging heat in the condenser 200, the refrigerant flows to the condenser outlet interface 202 on the valve manifold integration module 100 through the outlet of the condenser 200. The condenser outlet interface 202 communicates with the first branch 11 through one of the second flow channels 120. After the refrigerant flows into the first branch 11, the first opening 803 is in an open state, and the second opening 802 is in a closed state. The refrigerant flows through the first switch valve 21 through the first opening 803 and then flows to the third opening 818 to enter the second branch 12. The refrigerant entering the second branch 12 flows through the sixth switch valve 26 through the sixth opening 121 and then flows to the eighth opening 805, such that the refrigerant enters the third branch 13. The refrigerant from the third branch 13 flows to the air-conditioning heat exchanger inlet interface 203 through the ninth opening 804 so as to enter the air-conditioning heat exchanger 300. The refrigerant flowing out from the air-conditioning heat exchanger 300 flows to the tenth opening 816 through the air-conditioning heat exchanger outlet interface 204 so as to enter the fourth branch 14. The refrigerant in the fourth branch 14 flows to the thirteenth opening 806 so as to enter the second expansion valve 32. The refrigerant flowing through the second expansion valve 32 enters the evaporator 400 through the evaporator inlet interface 205. The refrigerant flowing out from the evaporator 400 enters the sixth branch 16 through the communication between the evaporator outlet interface 206 and the twentieth opening 812. The refrigerant entering the sixth branch 16 enters the gas-liquid separator 800 through the eighteenth opening 810. The refrigerant flowing out from the gas-liquid separator 800 enters the compressor 600 to realize cooling cycles.

In an embodiment, referring to FIG. 1, FIG. 3 to FIG. 5, and FIG. 8, the interface further includes a motor heat exchanger third interface 212 and a motor heat exchanger fourth interface 213. The valve manifold integration module 100 further includes a pump 60 and an accommodating box 70 for accommodating a coolant. An outlet of the pump 60 is connected to the motor heat exchanger third interface 212 such that the coolant is pumped to the motor heat exchanger third interface 212, so an inlet of the accommodating box 70 is connected to the motor heat exchanger fourth interface 213, and an outlet of the accommodating box 70 is connected to an inlet of the pump 60 such that the coolant is added to the pump 60. In this embodiment, driven by the pump 60, the coolant in the accommodating box 70 enters the motor heat exchanger 700, such that heat exchange between a coolant loop and a refrigerant loop is realized in the motor heat exchanger 700.

In an embodiment, referring to FIG. 1 to FIG. 5, the valve manifold integration module 100 further includes a three-way valve 40. A first port 401 of the three-way valve 40 is connected to the motor heat exchanger fourth interface 213, a second port 402 of the three-way valve 40 is configured to be connected to an inlet of a radiator 910 of a coolant flow path where a motor is located, and a third port 403 of the three-way valve 40 is configured to be connected to an inlet of a high-pressure system 920 of the coolant flow path where the motor is located. In this embodiment, the coolant passing through the three-way valve 40 is divided into two parts. One part enters the radiator 910. The other part enters the high-pressure system 920 having the motor, a motor controller, etc., and takes heat in the high-pressure system 920 into the motor heat exchanger 700 to exchange heat with the refrigerant loop.

Figure 5:
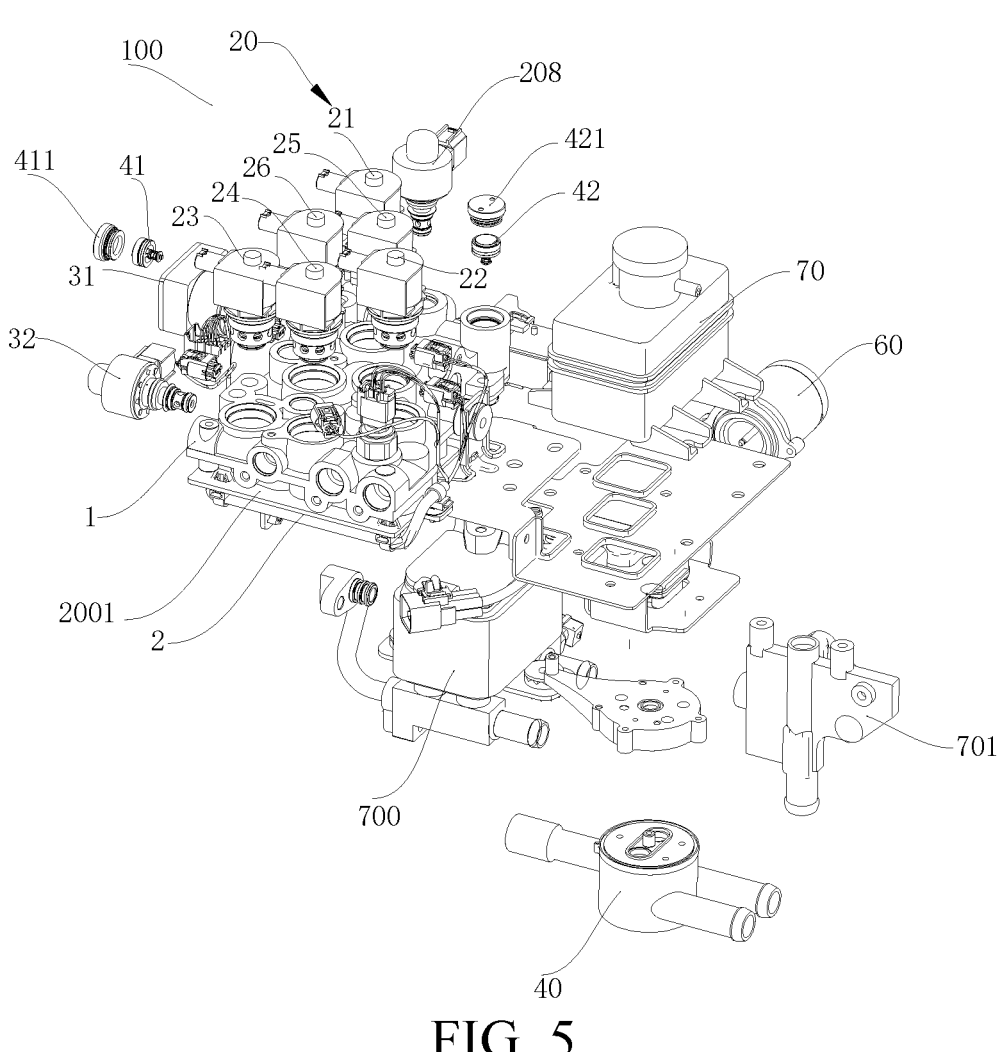
FIG. 5 is a schematic exploded structural view of the valve manifold integration module for a thermal management system according to some embodiments of the present disclosure.

In an embodiment, referring to FIG. 5, an integrated water pipe 701 is further integrated in the valve manifold integration module 100. The integrated water pipe 701 is configured to connect the accommodating box 70 and the pump 60, which facilitates connection.

Figure 3:
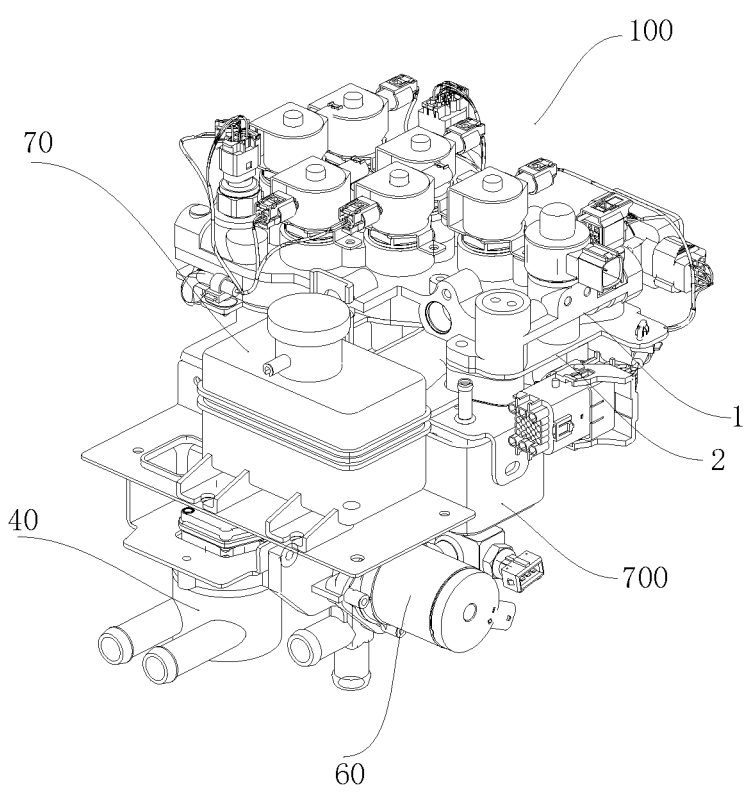
FIG. 3 and FIG. 4 are schematic three-dimensional structural views of a valve manifold integration module for a thermal management system according to some embodiments of the present disclosure.
Figure 4:
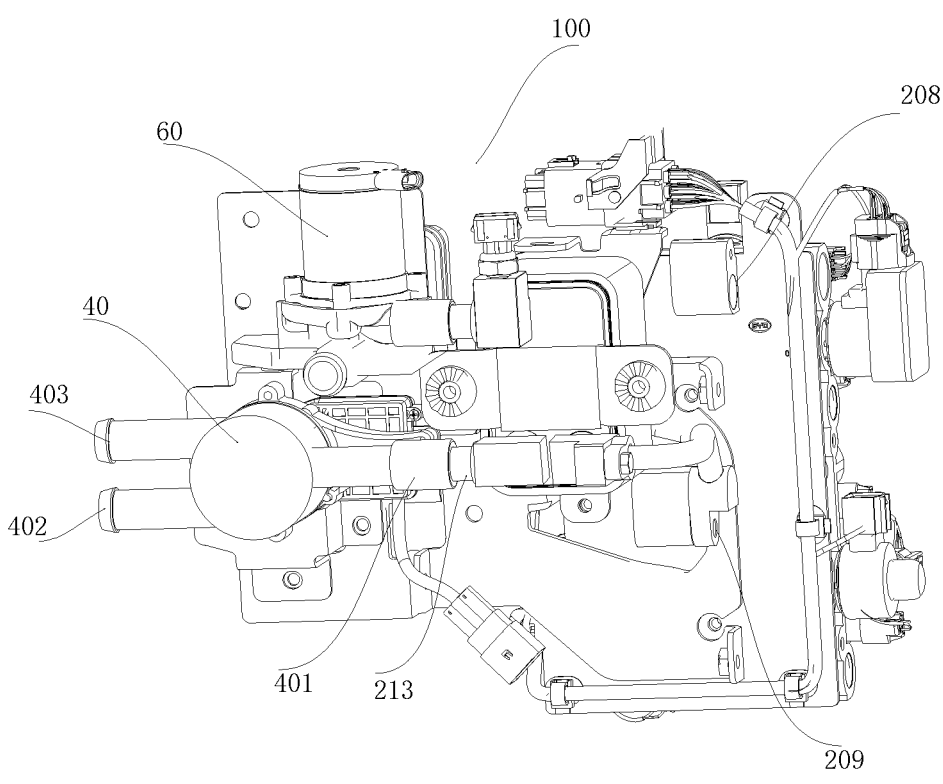

In an embodiment, referring to FIG. 3 to FIG. 5, the third switch valve 23 and the fourth switch valve 24 are mounted on a same side of the valve manifold integration module 100, such that the flow channel between the second port of the third switch valve 23 and the first port of the fourth switch valve 24 can be designed as short as possible, thereby satisfying low flow resistance.

In an embodiment, the switch valves and the expansion valves described above may be inserted into the valve manifold integration module 100, and may be fixed and locked through threads. The first one-way valve 41 and the second one-way valve 42 are also integrally inserted into mounting holes in the valve manifold integration module 100, and hermetically connected respectively through a first plug 411 and a second plug 421.

Figure 9:
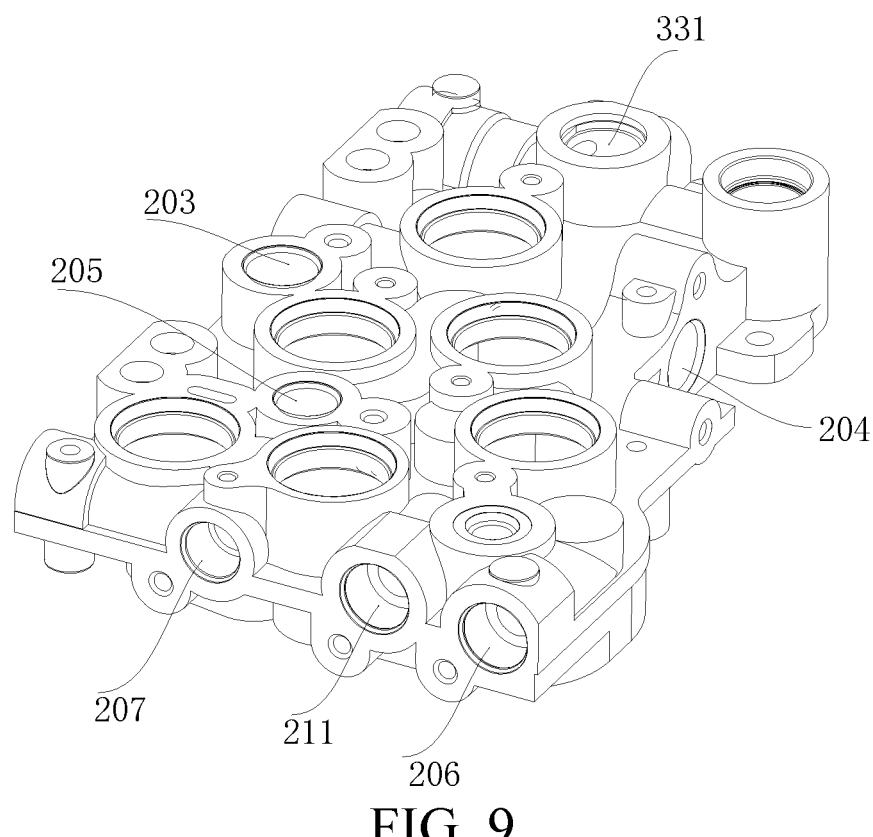
FIG. 9 is a schematic three-dimensional structural view of the first half body of the valve manifold integration module for a thermal management system according to some embodiments of the present disclosure, in which multiple interfaces are shown.
Figure 10:
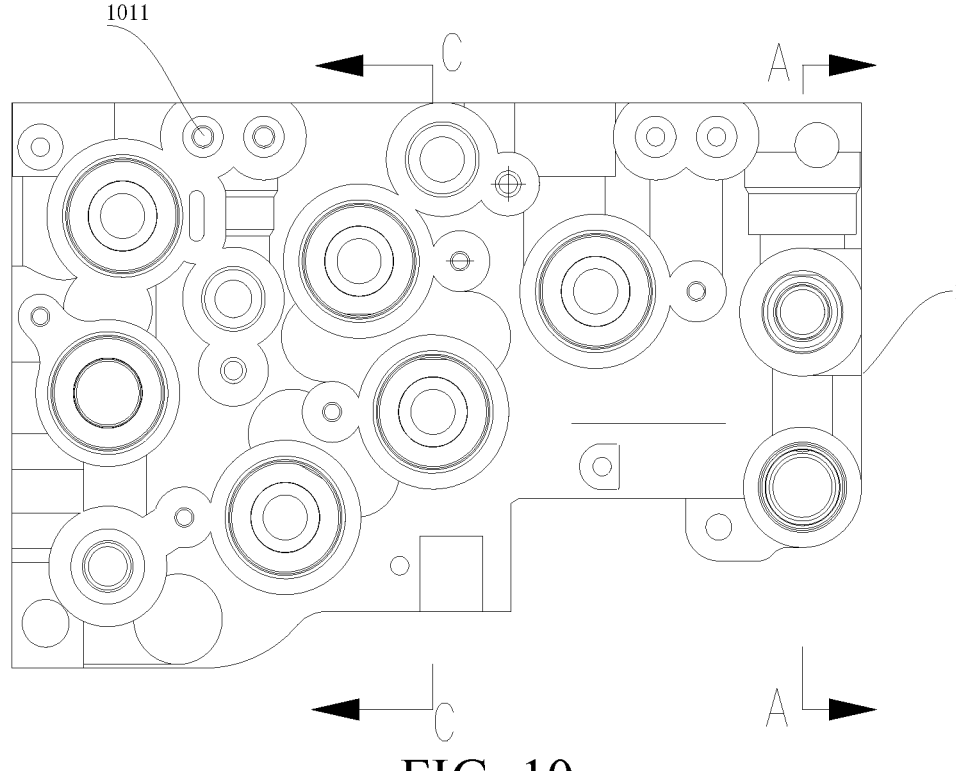
FIG. 10 is a top view of FIG. 9.

For example, referring to FIG. 9, a third expansion valve socket 331 and other sockets are formed in the valve manifold integration module 100. The third expansion valve 33 may be inserted into the third expansion valve socket 331, and the other valves may be correspondingly inserted into the other sockets, which will not be described here in detail in the present disclosure.

In addition, threaded holes for fastening and connecting the expansion valves are formed in the valve manifold integration module 100, so as to facilitate mounting and demounting of the expansion valves. For example, referring to FIG. 10, a first threaded hole 1011 is formed in the valve manifold integration module 100. A fastener, such as a bolt or a screw, may run through the first threaded hole 1011 so as to fasten and mount the first expansion valve 31 to the valve manifold integration module 100.

Figures 11, 12, 13:
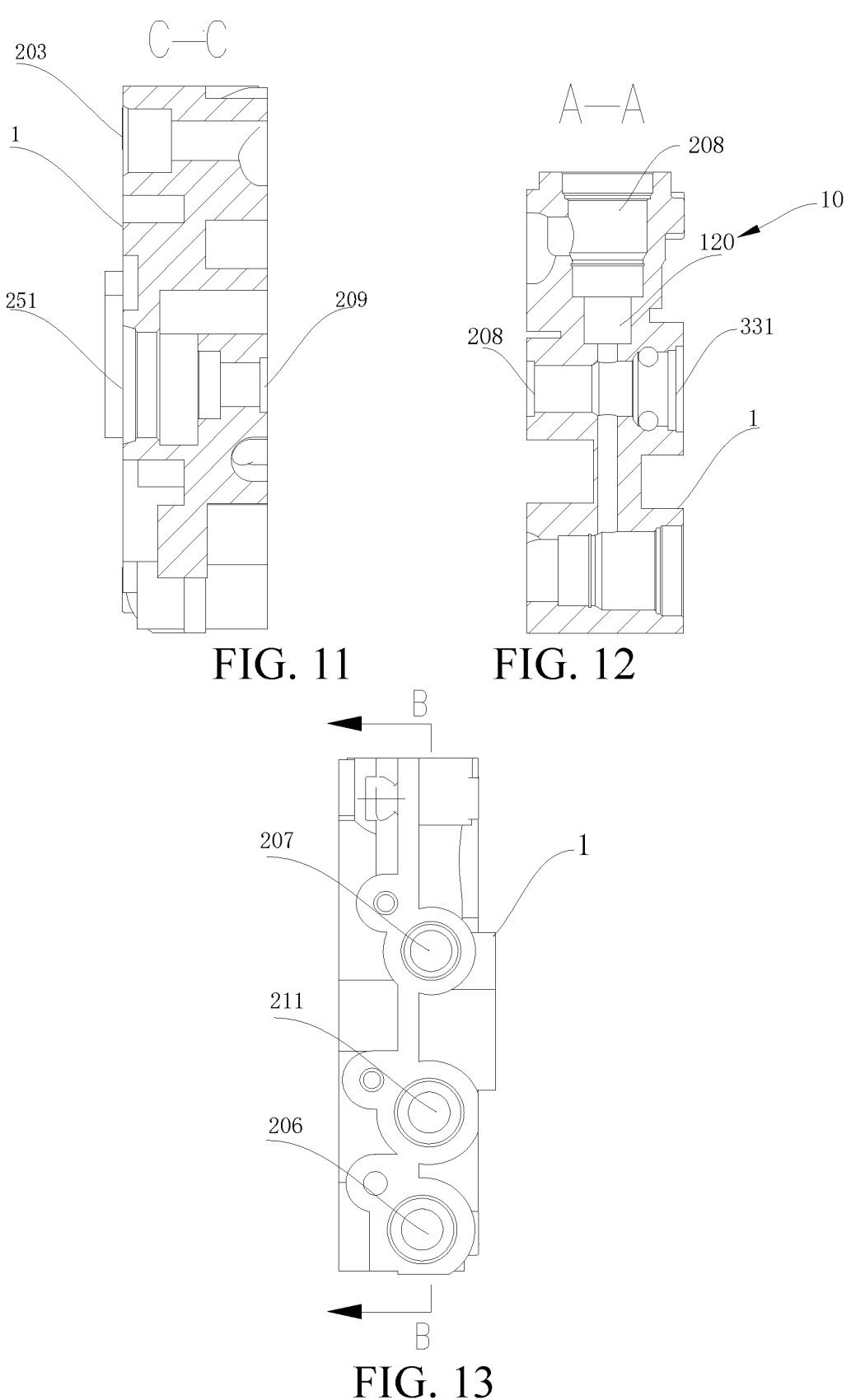
FIG. 11 is a schematic sectional view of FIG. 10 taken along line C-C.
FIG. 12 is a schematic sectional view of FIG. 10 taken along line A-A.
FIG. 13 is a side view of FIG. 9.
Figure 14:
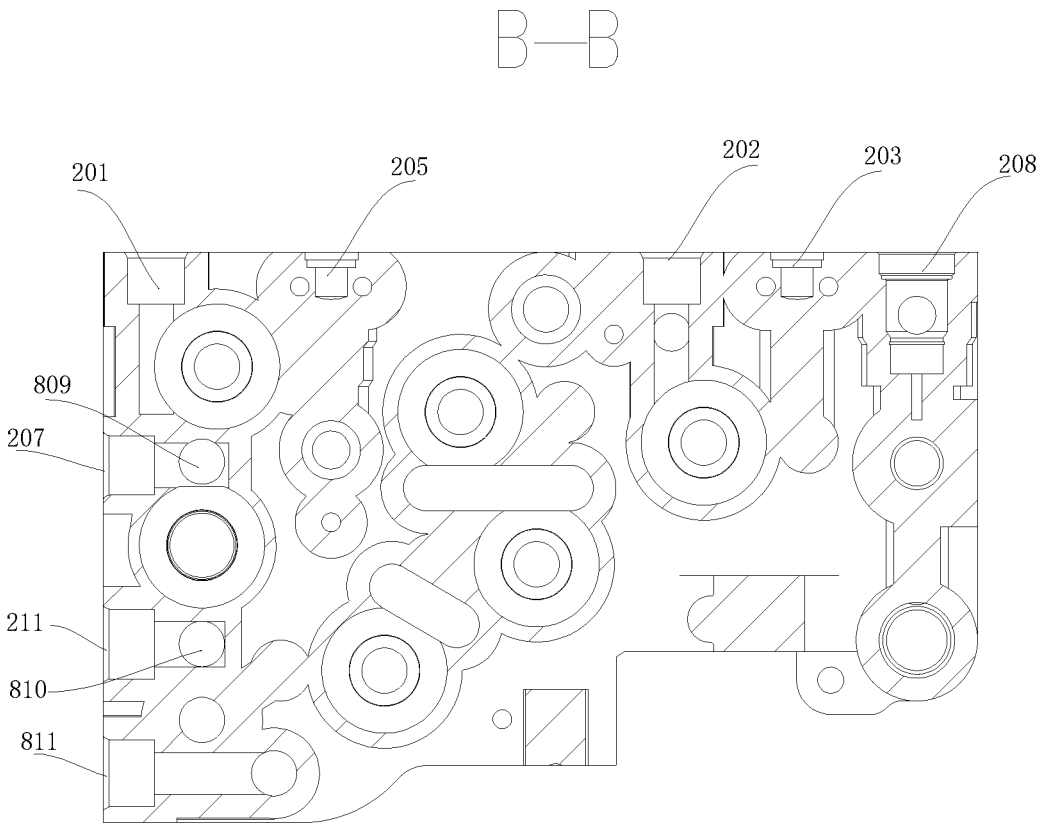
FIG. 14 is a schematic sectional view of FIG. 12 taken along line B-B.

Referring to FIG. 11, a threaded interface 251, into which the fifth switch valve may be inserted, is formed in the valve manifold integration module 100.

The present disclosure further provides a vehicle thermal management system 1000. The vehicle thermal management system 1000 includes thermal management system components and the valve manifold integration module 100. The thermal management system components include the compressor 600, the condenser 200, the air-conditioning heat exchanger 300, and the evaporator 400. At least one of the compressor interface, the condenser interface, the heat exchanger interface, and the evaporator interface is arranged/disposed on the valve manifold integration module 100 so as to be connected to the corresponding thermal management system component.

The multiple interfaces are arranged/disposed on the valve manifold integration module 100 and configured to communicate with the thermal management system components, and the multiple flow channels are provided inside the valve manifold integration module 100 instead of the existing connecting pipes, which is beneficial to reducing the number of connecting pipes in the thermal management system 1000, facilitates maintenance, and simplifies the vehicle thermal management system 1000.

In an embodiment, referring to FIG. 1 and FIG. 2, the vehicle thermal management system 1000 further includes the gas-liquid separator 800. The gas-liquid separator interface configured to be connected to the gas-liquid separator 800 is further arranged/disposed on the valve manifold integration module 100. By configuring the gas-liquid separator 800 to carry out gas-liquid separation on the refrigerant, the separated gaseous refrigerant enters the compressor 600, thereby preventing the liquid refrigerant or the mixture of the gaseous and liquid refrigerants from entering the compressor 600.

In an embodiment, referring to FIG. 1 and FIG. 2, the vehicle thermal management system 1000 further includes the battery pack heat exchanger 500. The battery pack heat exchanger interface configured to be connected to the battery pack heat exchanger 500 is further arranged/disposed on the valve manifold integration module 100, so as to heat or cool the battery pack by selecting the corresponding fluid channel, thereby ensuring normal operation of the battery pack. In this way, there is no need to separately arrange/dispose the thermal management system 1000 to heat or cool the battery pack, thereby reducing the design costs of the vehicle thermal management system 1000.

In an embodiment, referring to FIG. 1 and FIG. 2, the vehicle thermal management system 1000 further includes the motor heat exchanger 700. The motor heat exchanger interface configured to be connected to the motor heat exchanger 700 is further arranged/disposed on the valve manifold integration module 100, so as to realize heat exchange with the motor by selecting the corresponding fluid channel, thereby ensuring normal operation of the motor. In this way, there is no need to separately arrange/dispose the thermal management system 1000 to exchange heat with the motor, thereby reducing the design costs of the vehicle thermal management system 1000.

The present disclosure further provides a vehicle. The vehicle includes the vehicle thermal management system 1000 described above.

The preferred embodiments of the present disclosure have been described in detail above in conjunction with the accompanying drawings. However, the present disclosure is not limited to the details in the above embodiments, and various simple variations may be made to the technical solutions of the present disclosure within the scope of the technical concept of the present disclosure. These simple variations fall within the scope of the present disclosure.

It should be additionally noted that the technical features described in the foregoing embodiments may be combined in any proper manner in a case without conflict. In order to avoid unnecessary repetitions, various possible combinations are not explained separately in the present disclosure.

In addition, different embodiments of the present disclosure may also be arbitrarily combined without departing from the idea of the present disclosure, and these combinations shall still be regarded as content disclosed in the present disclosure.

What is claimed is:

1. A valve manifold integration module for a thermal management system, the thermal management system having a plurality of thermal management modes, wherein the valve manifold integration module comprises:

a plurality of flow channels disposed inside the valve manifold integration module; and a valve manifold comprising a plurality of valves, the valves being disposed on the valve manifold integration module and communicating with the flow channels, wherein the flow channels communicating with each other via the valves to form fluid channels to realize at least one of the thermal management modes, a battery pack heat exchanger interface including a battery pack heat exchanger first interface and a battery pack heat exchanger second interface, wherein:

the valve manifold comprises a third expansion valve and a fourth switch valve, a first port of the third expansion valve is connected to the battery pack heat exchanger second interface, and a second port of the third expansion valve is connected to an air-conditioning heat exchanger outlet interface, and a first port of the fourth switch valve is connected to the battery pack heat exchanger first interface, and a second port of the fourth switch valve is configured to be connected to an inlet of a compressor.

2. The valve manifold integration module according to claim 1, wherein the flow channels comprise first flow channels and second flow channels, the first flow channels are distributed in a same plane, and communications between the first flow channels and the second flow channels are controlled by the valve manifold to form the fluid channels.

3. The valve manifold integration module according to claim 1, further comprising a condenser interface, an air-conditioning heat exchanger interface, and an evaporator interface, the condenser interface, the air-conditioning heat exchanger interface, and the evaporator interface are configured to connect to corresponding components of an external thermal management system.

4. The valve manifold integration module according to claim 3, wherein the condenser interface comprises a condenser outlet interface, the air-conditioning heat exchanger interface comprises an air-conditioning heat exchanger inlet interface and the air-conditioning heat exchanger outlet interface, and the evaporator interface comprises an evaporator inlet interface;

the valve manifold comprises a first switch valve and a second expansion valve;

a first port of the first switch valve is connected to the condenser outlet interface, and a second port of the first switch valve is connected to the air-conditioning heat exchanger inlet interface; and a first port of the second expansion valve is connected to the air-conditioning heat exchanger outlet interface, and a second port of the second expansion valve is connected to the evaporator inlet interface, to realize an air-conditioning cooling mode of the thermal management modes.

5. The valve manifold integration module according to claim 4, wherein the valve manifold further comprises a first expansion valve and a second switch valve;

a first port of the first expansion valve is connected to the condenser outlet interface, and a second port of the first expansion valve is connected to the air-conditioning heat exchanger inlet interface; and a first port of the second switch valve is connected to the air-conditioning heat exchanger outlet interface, and a second port of the second switch valve is connected to the inlet of the compressor, to realize an air-conditioning heating mode of the thermal management modes.

6. The valve manifold integration module according to claim 4, wherein the plurality of thermal management modes comprise a battery cooling mode, and an air-conditioning cooling and battery cooling mode.

7. The valve manifold integration module according to claim 6, wherein the valve manifold integration module further comprises a compressor interface comprising a compressor outlet interface, and a motor heat exchanger interface comprising a motor heat exchanger first interface and a motor heat exchanger second interface;

the valve manifold further comprises a second switch valve and a third switch valve; and a first port of the third switch valve is connected to the compressor outlet interface, a second port of the third switch valve is connected to the battery pack heat exchanger first interface, a second port of the third expansion valve is connected to the motor heat exchanger first interface, a first port of the second switch valve is connected to the motor heat exchanger second interface, and a second port of the second switch valve is configured to be connected to the inlet of the compressor, to realize the battery heating mode, or the air-conditioning cooling and battery heating mode of the thermal management modes.

8. The valve manifold integration module according to claim 7, wherein the valve manifold further comprises a first expansion valve; and a first port of the first expansion valve is connected to the condenser outlet interface, and a second port of the first expansion valve is connected to the motor heat exchanger first interface, to realize a heat pump heating mode, or a heat pump heating and battery cooling mode, or a heat pump heating and battery heating mode of the thermal management modes.

9. The valve manifold integration module according to claim 8, wherein the motor heat exchanger second interface is further connected to the first port of the second expansion valve, to realize an air-conditioning cooling, air-conditioning dehumidifying, and battery heating mode, or an air-conditioning cooling, air-conditioning dehumidifying, and battery cooling mode of the thermal management modes.

10. The valve manifold integration module according to claim 8, wherein the valve manifold further comprises a fifth switch valve and a sixth switch valve;

a first port of the fifth switch valve is connected to the second port of the first switch valve and the second port of the first expansion valve, and a second port of the fifth switch valve is connected to the motor heat exchanger first interface; and a first port of the sixth switch valve is connected to the second port of the first switch valve and the second port of the first expansion valve, and a second port of the sixth switch valve is configured to be connected to the air-conditioning heat exchanger inlet interface.

11. The valve manifold integration module according to claim 8, wherein the valve manifold further comprises a first one-way valve and a second one-way valve;

a first port of the first one-way valve is connected to the second port of the third expansion valve, and a second port of the first one-way valve is configured to be connected to the motor heat exchanger first interface, wherein the first one-way valve is configured to allow a fluid to flow from the first port to the second port of the first one-way valve; and a first port of the second one-way valve is connected to the air-conditioning heat exchanger outlet interface, and a second port of the second one-way valve is connected to the second port of the third expansion valve, wherein the second one-way valve is configured to allow the fluid to flow from the first port to the second port of the second one-way valve.

12. The valve manifold integration module according to claim 4, wherein the valve manifold integration module further comprises a gas-liquid separator interface, the gas-liquid separator interface comprises a gas-liquid separator inlet interface, the evaporator interface further comprises an evaporator outlet interface, and the evaporator outlet interface is connected to the gas-liquid separator inlet interface.

13. The valve manifold integration module according to claim 10, wherein the flow channels comprise first flow channels distributed in a same plane, wherein the first flow channels comprise a first branch, the condenser outlet interface communicating with the first port of the first switch valve and the first port of the first expansion valve through the first branch; or the first flow channels comprise a second branch, the second port of the first switch valve and the second port of the first expansion valve communicating with the first port of the fifth switch valve through the second branch, and the second port of the first switch valve and the second port of the first expansion valve communicating with the first port of the sixth switch valve through the second branch; or the first flow channels comprise a third branch, the second port of the sixth switch valve communicating with the air-conditioning heat exchanger inlet interface through the third branch; or the first flow channels comprise a fourth branch, the air-conditioning heat exchanger outlet interface and the motor heat exchanger second interface communicating with the first port of the second switch valve through the fourth branch, and the air-conditioning heat exchanger outlet interface and the motor heat exchanger second interface communicating with the first port of the second expansion valve through the fourth branch; or the first flow channels comprise a fifth branch, the second port of the third switch valve and the battery pack heat exchanger first interface communicating with the first port of the fourth switch valve through the fifth branch; or the first flow channels comprise a sixth branch, the second port of the second switch valve, an evaporator outlet interface, and the second port of the fourth switch valve communicating with the inlet of the compressor through the sixth branch.

14. The valve manifold integration module according to claim 2, further comprising a first half body and a second half body, wherein the first half body comprises a first connection surface, the second half body comprises a second connection surface, and the first connection surface is connected to the second connection surface; and the second flow channels are disposed inside the first half body, the second connection surface of the second half body comprises at least one groove, and the at least one groove on the second connection surface and the first connection surface define the first flow channels.

15. The valve manifold integration module according to claim 2, further comprising a first half body and a second half body, wherein the first half body comprises a first connection surface, the second half body comprises a second connection surface, and the first connection surface is connected to the second connection surface; and the second flow channels are disposed inside the first half body, the first connection surface of the first half body comprises at least one groove, and the second connection surface and the at least one groove on the first half body define the first flow channels.

16. The valve manifold integration module according to claim 3, wherein the valve manifold integration module further comprises a motor heat exchanger third interface and a motor heat exchanger fourth interface, and the valve manifold integration module further comprises a pump and an accommodating box for accommodating a coolant, an outlet of the pump is connected to the motor heat exchanger third interface, the coolant is pumped to the motor heat exchanger third interface, an inlet of the accommodating box is connected to the motor heat exchanger fourth interface, and an outlet of the accommodating box is connected to an inlet of the pump.

17. The valve manifold integration module according to claim 16, further comprising a three-way valve, wherein a first port of the three-way valve is connected to the motor heat exchanger fourth interface, a second port of the three-way valve is configured to be connected to an inlet of a radiator of a coolant flow path where a motor is located, and a third port of the three-way valve is configured to be connected to an inlet of a high-pressure system of the coolant flow path.

18. A vehicle thermal management system, comprising thermal management system components and a valve manifold integration module, the thermal management system components comprising a compressor, a condenser, an air-conditioning heat exchanger, and an evaporator, and at least one of an compressor interface, an condenser interface, an heat exchanger interface, and an evaporator interface is disposed on the valve manifold integration module to be connected to a corresponding thermal management system component, wherein the valve manifold integration module comprises:

a plurality of flow channels disposed inside the valve manifold integration module; and a valve manifold comprising a plurality of valves, the valves being disposed on the valve manifold integration module and communicating with the flow channels, wherein the flow channels communicating with each other via the valves to form fluid channels to realize at least one of thermal management modes of a thermal management system, a battery pack heat exchanger interface including a battery pack heat exchanger first interface and a battery pack heat exchanger second interface, wherein:

the valve manifold comprises a third expansion valve and a fourth switch valve, a first port of the third expansion valve is connected to the battery pack heat exchanger second interface, and a second port of the third expansion valve is connected to an air-conditioning heat exchanger outlet interface, and a first port of the fourth switch valve is connected to the battery pack heat exchanger first interface, and a second port of the fourth switch valve is configured to be connected to an inlet of the compressor.

19. The vehicle thermal management system according to claim 18, further comprising a gas-liquid separator, wherein a gas-liquid separator interface is configured to connect to the gas-liquid separator and is disposed on the valve manifold integration module.

20. The vehicle thermal management system according to claim 18, further comprising a battery pack heat exchanger, wherein the battery pack heat exchanger interface is configured to connect to the battery pack heat exchanger to heat or cool a battery pack by selecting a corresponding fluid channel.

21. The vehicle thermal management system according to claim 18, further comprising a motor heat exchanger, wherein a motor heat exchanger interface is configured to connect to the motor heat exchanger and is disposed on the valve manifold integration module, to exchange heat with a motor by selecting a corresponding fluid channel.

22. A vehicle, comprising a vehicle thermal management system comprising thermal management system components and a valve manifold integration module, the thermal management system components comprising a compressor, a condenser, an air-conditioning heat exchanger, and an evaporator, and at least one of an compressor interface, an condenser interface, an heat exchanger interface, and an evaporator interface is disposed on the valve manifold integration module to be connected to a corresponding thermal management system component, wherein the valve manifold integration module comprises:

a plurality of flow channels disposed inside the valve manifold integration module; and a valve manifold comprising a plurality of valves, the valves being disposed on the valve manifold integration module and communicating with the flow channels, wherein the flow channels communicating with each other via the valves to form fluid channels to realize at least one of thermal management modes of a thermal management system, a battery pack heat exchanger interface including a battery pack heat exchanger first interface and a battery pack heat exchanger second interface, wherein:

the valve manifold comprises a third expansion valve and a fourth switch valve, a first port of the third expansion valve is connected to the battery pack heat exchanger second interface, and a second port of the third expansion valve is connected to an air-conditioning heat exchanger outlet interface, and a first port of the fourth switch valve is connected to the battery pack heat exchanger first interface, and a second port of the fourth switch valve is configured
to be connected to an inlet of the compressor.

* * * * *